US012637293B2

(12) United States Patent
Mason et al.

(10) Patent No.: US 12,637,293 B2
(45) Date of Patent: May 26, 2026

(54) QUICK CHANGE GUIDE RAIL ASSEMBLIES

(71) Applicant: JBT Marel Corporation, Chicago, IL (US)

(72) Inventors: Kristen Rose Mason, Mentor, OH (US); Chane Lee, Sarasota, FL (US); Gregory Brinovec, Willoughby, OH (US)

(73) Assignee: JBT Marel Corporation, Chicago, IL (US)

( * ) Notice: Subject to any disclaimer, the term of this patent is extended or adjusted under 35 U.S.C. 154(b) by 178 days.

(21) Appl. No.: 18/491,488

(22) Filed: Oct. 20, 2023

(65) Prior Publication Data

US 2024/0132292 A1    Apr. 25, 2024
US 2024/0228176 A9    Jul. 11, 2024

Related U.S. Application Data

(60) Provisional application No. 63/380,583, filed on Oct. 23, 2022.

(51) Int. Cl.
B65G 21/20        (2006.01)
B65B 7/28          (2006.01)

(52) U.S. Cl.
CPC ..... B65G 21/2063 (2013.01); B65G 21/2072 (2013.01); B65B 7/2857 (2013.01); B65G 2201/0235 (2013.01)

(58) Field of Classification Search
CPC ............ B65G 21/2063; B65G 21/2072; B65G 2201/0235; B65G 47/846; B65B 7/2857; B21D 51/30
See application file for complete search history.

(56) References Cited

U.S. PATENT DOCUMENTS

| | | | |
|---|---|---|---|
| 2,052,620 A | 9/1936 | Guenther | |
| 2,692,715 A | 10/1954 | Doudera | |
| 3,545,160 A | 12/1970 | Jantze et al. | |
| 4,255,035 A * | 3/1981 | Lange | G03B 9/14 396/452 |

(Continued)

FOREIGN PATENT DOCUMENTS

| EP | 2583916 A1 * | 4/2013 | ............. B65G 21/06 |
|---|---|---|---|

OTHER PUBLICATIONS

American Holt, "Angelus 120L/121L Seamer," internal brochure regarding aftermarket parts, Jul. 16, 2019, 65 pages.

(Continued)

*Primary Examiner* — Mark A Deuble
(74) *Attorney, Agent, or Firm* — Christensen O'Connor Johnson Kindness PLLC

(57)                ABSTRACT

A guide rail device mountable to a container sealing line for guiding moving containers. The guide rail device includes a base mountable to the container sealing line, and a guide rail assembly having a first guide surface adapted to guide containers along a portion of the can sealing line. The guide rail assembly includes a first member, and a second member, wherein the first and second members are adjustably attached to one another. The guide rail assembly is securable to the base after the base is mounted to the container sealing line such that the guide rail assembly and base are self-aligning with respect to one another.

15 Claims, 28 Drawing Sheets

(56) References Cited

U.S. PATENT DOCUMENTS

| | | | | |
|---|---|---|---|---|
| 5,211,280 A * | 5/1993 | Houde | B65G 21/2072 | |
| | | | 198/836.3 | |
| 5,322,160 A * | 6/1994 | Markiewicz | B65G 21/2072 | |
| | | | 198/836.3 | |
| 5,492,218 A * | 2/1996 | Falkowski | B65G 21/2072 | |
| | | | 198/836.3 | |
| 5,682,976 A * | 11/1997 | Jorgensen | B65G 21/2072 | |
| | | | 198/836.3 | |
| 6,305,528 B1 * | 10/2001 | Leonard | B65G 21/2072 | |
| | | | 198/836.3 | |
| 6,427,829 B1 * | 8/2002 | Ledingham | B65G 21/2072 | |
| | | | 198/836.3 | |
| 6,454,084 B2 * | 9/2002 | Csiki | B65G 21/2072 | |
| | | | 198/836.3 | |
| 7,530,453 B2 * | 5/2009 | Ingraham | B65G 21/2072 | |
| | | | 198/817 | |
| 7,748,523 B2 * | 7/2010 | Robertson | B65G 47/846 | |
| | | | 198/836.3 | |
| 10,065,756 B2 | 9/2018 | Washikazi et al. | | |
| 10,384,876 B2 * | 8/2019 | Pieters | B65G 15/62 | |
| 10,941,029 B2 | 3/2021 | Yuse et al. | | |
| 12,103,788 B2 * | 10/2024 | Dünki | B21D 51/2692 | |
| 2014/0321949 A1 | 10/2014 | Mejia-Quinchia et al. | | |
| 2016/0194155 A1 * | 7/2016 | Doherty | B65G 21/2072 | |
| | | | 198/723 | |

OTHER PUBLICATIONS

Pneumatic Scale Angelus, "Angelus Legacy Series Can Seamer: Model 121L," brochure, 2 pages. As early as Oct. 22, 2022.
Pneumatic Scale Angelus, "Model 121L Seamer, Serial No. 121L-13418: Operation, Maintenance and Parts Manual," Apr. 2012, 208 pags.

* cited by examiner

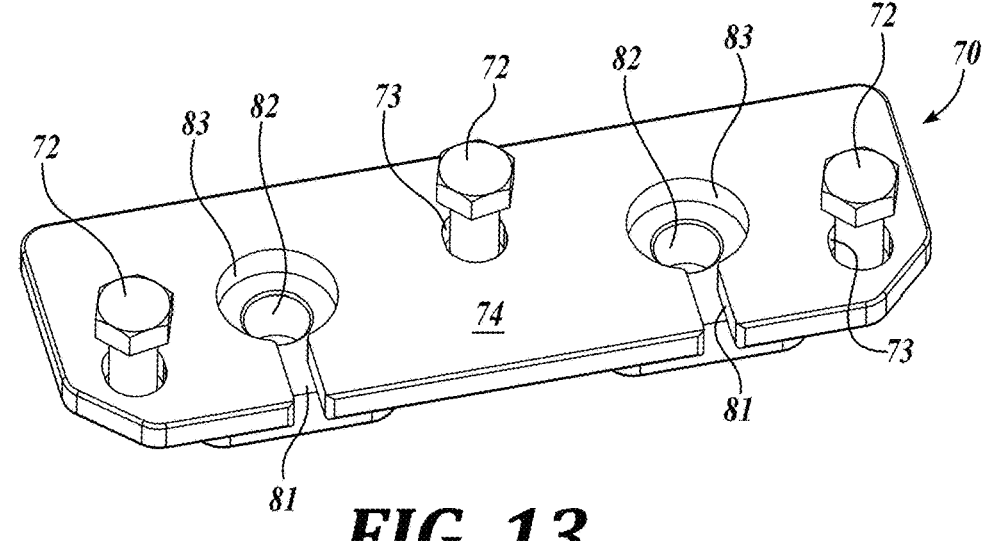
FIG. 13
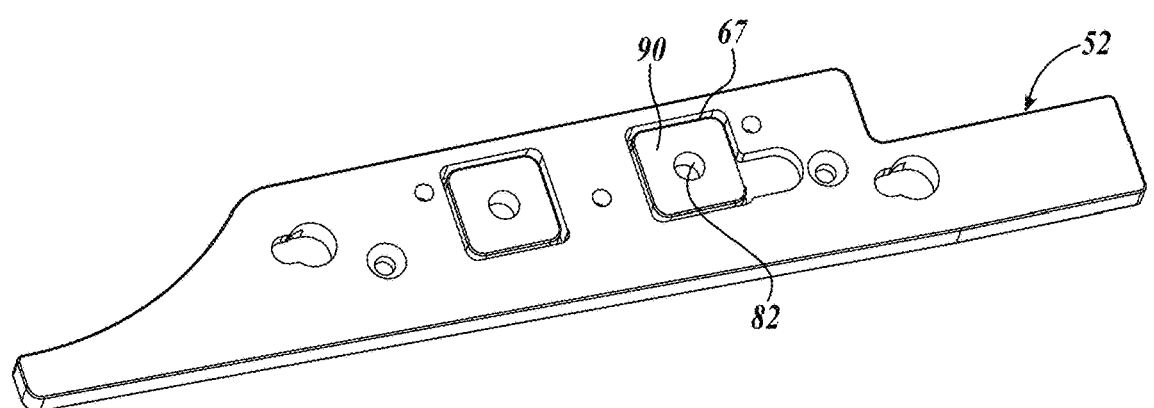
FIG. 14
FIG. 15

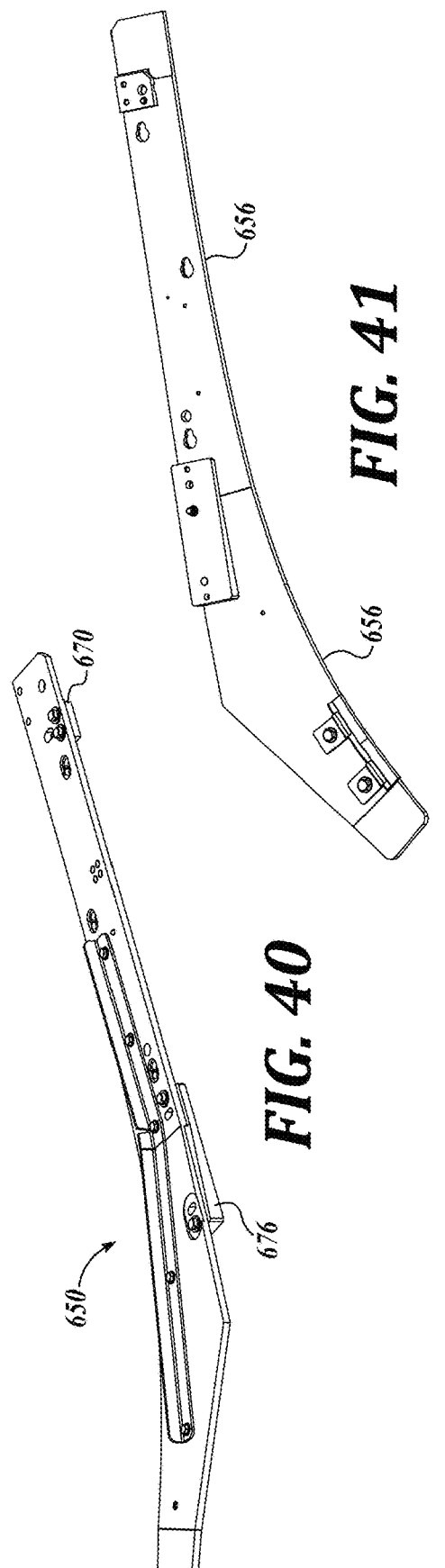
*FIG. 40*
*FIG. 41*
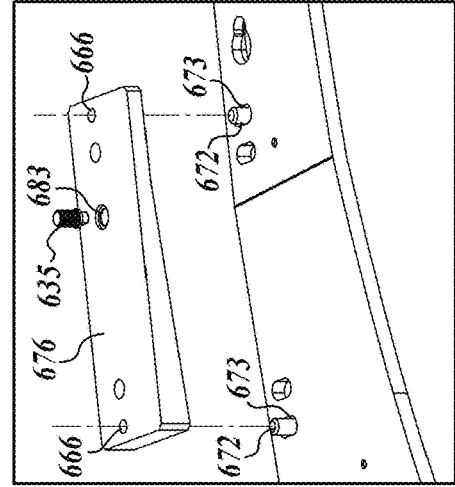
*FIG. 41B*
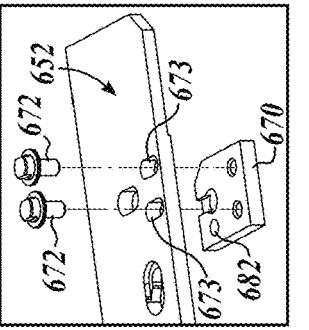
*FIG. 41A*

QUICK CHANGE GUIDE RAIL ASSEMBLIES

CROSS-REFERENCE TO RELATED APPLICATION

This application claims the benefit of U.S. Provisional Application No. 63/380,583, filed Oct. 23, 2022, the entire contents of which are incorporated herein by reference.

BACKGROUND

Canned beverages are packaged in a wide variety of can sizes and shapes, and many packaging plants fill multiple sizes of cans from one day to the next (or even within a single day. Each can size change necessitates stopping packaging while various guide rails, turrets, and other assemblies of the can seaming line are either adjusted for the new can size/shape or replaced with the appropriately sized and configured components. This is a time-consuming process that limits production. In the case of guide rails, for example, replacing a guide rail to accommodate a different can size/shape requires proper alignment of each of the guide rails with respect to the can seamer conveyor before production can resume.

While a variety of devices and techniques may exist for changing guide rails and other components of container seaming systems, it is believed that no one prior to the inventor(s) has made or used an invention as described herein.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a guide rail device mountable to a container sealing line for guiding moving containers is provided. The guide rail device may include: (a) a base mountable to the container sealing line; and (b) a guide rail assembly having a first guide surface adapted to guide containers along a portion of the container sealing line, wherein the guide rail assembly comprises: a first member; and a second member, wherein the first and second members are adjustably attachable to one another; wherein the guide rail assembly is securable to the base after the base is mounted to the container sealing line such that the guide rail assembly and base are self-aligning with respect to one another.

In any of the embodiments described herein, the second member is mountable to the first member in one of a plurality of horizontally displaced positions, wherein a selected horizontally displaced position is such that the first member suitably engages a container of the container sealing line when the second member is secured to the base.

In any of the embodiments described herein, the second member when attached to first member in the selected horizontally displaced position is non-adjustably securable to the base.

In any of the embodiments described herein, the guide rail assembly is securable to the base such that the first member is immediately adjacent the base with the second member separated from the base by the first member.

In any of the embodiments described herein, the guide rail assembly further includes a plurality of adjustment fasteners for adjustably attaching the first member to the second member.

In any of the embodiments described herein, each adjustment fastener has a diameter; one of said first and second members includes a plurality of adjustment apertures through which said adjustment fasteners extend, the adjustment apertures having an inner diameter greater than the diameter of the adjustment fasteners; and the other of said first and second members includes a plurality of receiving apertures alignable with said adjustment apertures of the first member, the receiving apertures adapted to receive the adjustment fasteners therein for adjustable attachment of the first and second members.

In any of the embodiments described herein, a third member is attached to at least one of the first and second members, wherein said first guide surface is provided on the third member.

In any of the embodiments described herein, a third member is attached to at least one of the first and second members, wherein the third member has a second guide surface adapted to guide containers along a portion of the can sealing line.

In any of the embodiments described herein, said first guide surface is provided on said first member, and the first and third members are secured to one another in a spaced-apart relationship, with the second member located between the first and third members.

In any of the embodiments described herein, the second and third members are located in a spaced-apart relationship.

In any of the embodiments described herein, the base includes a planar support plate having a support surface, wherein the guide rail assembly is securable to the base such that the first member is in contact with the support surface of the base, with the second member separated from the base by the first member.

In any of the embodiments described herein, the guide rail assembly further includes a plurality of mounting fasteners for non-adjustably securing the guide rail assembly to the base.

In any of the embodiments described herein, each of said mounting fasteners extends through an aperture in the first member and is retained on the guide rail assembly.

In any of the embodiments described herein, the base includes a plurality of apertures for receiving the mounting fasteners therein for non-adjustably securing the guide rail assembly to the base.

In any of the embodiments described herein, each of said mounting fasteners includes a mounting bolt having a shaft comprising an upper portion, a threaded middle portion extending from the upper portion, and a lower portion extending from the middle portion.

In any of the embodiments described herein, each of said mounting fasteners extends through an aperture in the first member, and is retained on the guide rail assembly; the base includes a plurality of mounting apertures for receiving the mounting fasteners therein for non-adjustably securing the guide rail assembly to the base, the mounting apertures extending from a support surface of the base; wherein each of the receiving apertures in the base includes an internally threaded first portion adapted for threadably receiving a middle portion of a mounting fastener, and a second guide portion adapted for receiving a lower portion of a mounting fastener for securing the guide rail assembly to the base.

In any of the embodiments described herein, the second member includes at least one projection extending from the bottom surface thereof, and the first member includes at least one projection configured to matingly receive said at least one projection therein.

In any of the embodiments described herein, said second member includes an adjustment plate.

In any of the embodiments described herein, said first guide surface is provided on at least one of the first member and the second member.

In accordance with another embodiment of the present disclosure, a guide rail system selectively mountable to a container sealing line is provided. The guide rail system may include: a base alignably mountable to the container sealing line; and two or more guide rail assemblies, wherein each guide rail assembly includes at least one guide surface for guiding movement of containers conveyed on the sealing line; wherein each of said guide rail assemblies is selectively mountable to the base after the base is mounted to the container sealing line such that each guide rail assembly and base are self-aligning with respect to one another.

In any of the embodiments described herein, each guide rail assembly includes a first member and a second member, the second member is mountable to the first member in one of a plurality of horizontally displaced positions, wherein a selected horizontally displaced position is such that the first member suitably engages a container of the container sealing line when the second member is secured to the base.

In any of the embodiments described herein, the second member when attached to first member in the selected horizontally displaced position is non-adjustably securable to the base.

In accordance with another embodiment of the present disclosure, a mounting bolt for locatably securing a first member to a second member is provided. The mounting bolt may include: a head; and a shaft extending distally away from the head, the shaft comprising an unthreaded upper portion, a threaded middle portion extending distally away from the upper portion, and an unthreaded lower portion extending distally away from the middle portion.

In any of the embodiments described herein, a first chamfered shoulder located at a distal end of the upper portion, and a second chamfered shoulder located at a distal end of the lower portion.

In accordance with another embodiment of the present disclosure, a guide rail device mountable to a container sealing line for guiding moving containers is provided. The guide rail device may include: a base mountable to the container sealing line for supporting the guide rail device in at least one vertical position with respect to the container sealing line; and a guide rail assembly, comprising: a first guide rail defining a first guide surface adapted to guide containers along a portion of the container sealing line; and an adjustment member adjustably securable to the first guide rail in one of a plurality of horizontally displaced positions and securable to the base in a non-adjustable position after being secured to the first guide rail, wherein a selected horizontally displaced position is such that the first guide rail suitably engages a container of the container sealing line when the adjustment member is secured to the base.

BRIEF DESCRIPTION OF THE DRAWINGS

While the specification concludes with claims particularly pointing out and distinctly claiming the invention, it is believed that the invention will be better understood from the detailed description of certain embodiments thereof when read in conjunction with the accompanying drawings. Unless the context indicates otherwise, like numerals are used in the drawings to identify similar elements in the drawings. In addition, some of the figures may have been simplified by the omission of certain elements in order to more clearly show other elements. Such omissions are not necessarily indicative of the presence or absence of particular elements in any of the exemplary embodiments, except as may be explicitly stated in the corresponding detailed description.

FIG. 13 is an isometric view, from above, of the adjustment plate of the rail assembly of FIG. 7.

FIG. 14 is an isometric view, from below, of the adjustment plate of the rail assembly of FIG. 7.

FIG. 15 is an isometric view, from below, of the rail assembly of FIG. 7, with the mounting bolts and adjustment fasteners omitted.

5

Figure 20:
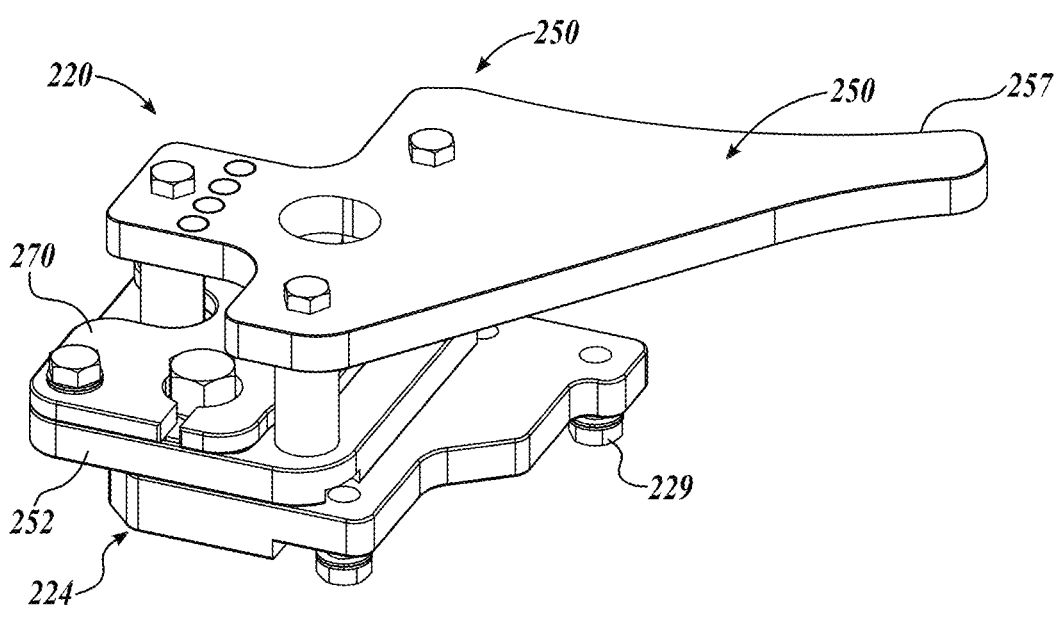
FIG. 20 is an isometric view of an outer discharge guide rail device according to one embodiment of the present disclosure.
Figure 21:
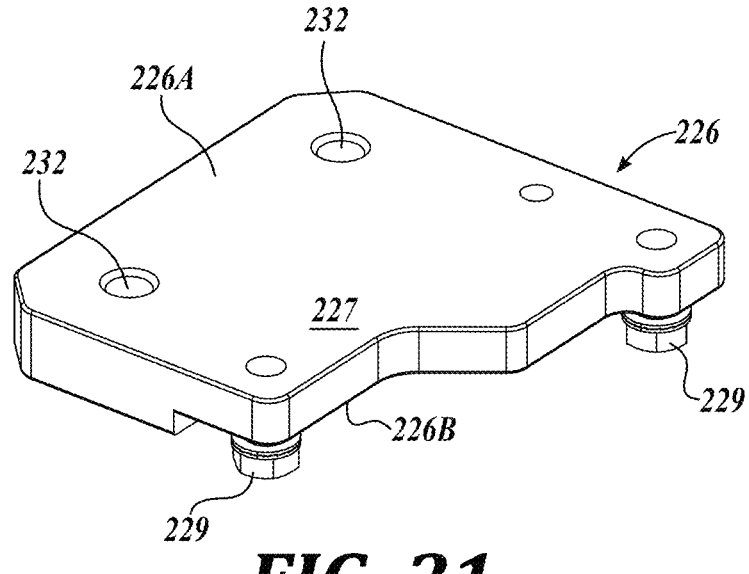

FIG. 21 is an isometric view of the support plate of the outer discharge guide rail device of FIG. 20.

Figure 22:
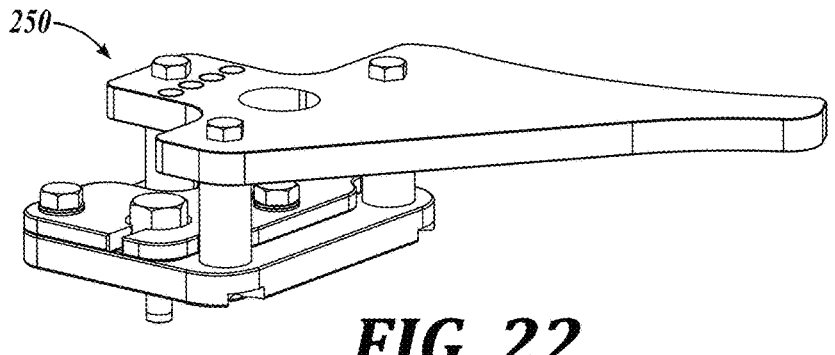

FIG. 22 is an isometric front view of the replaceable rail assembly of the outer discharge guide rail device of FIG. 20.

Figure 23:
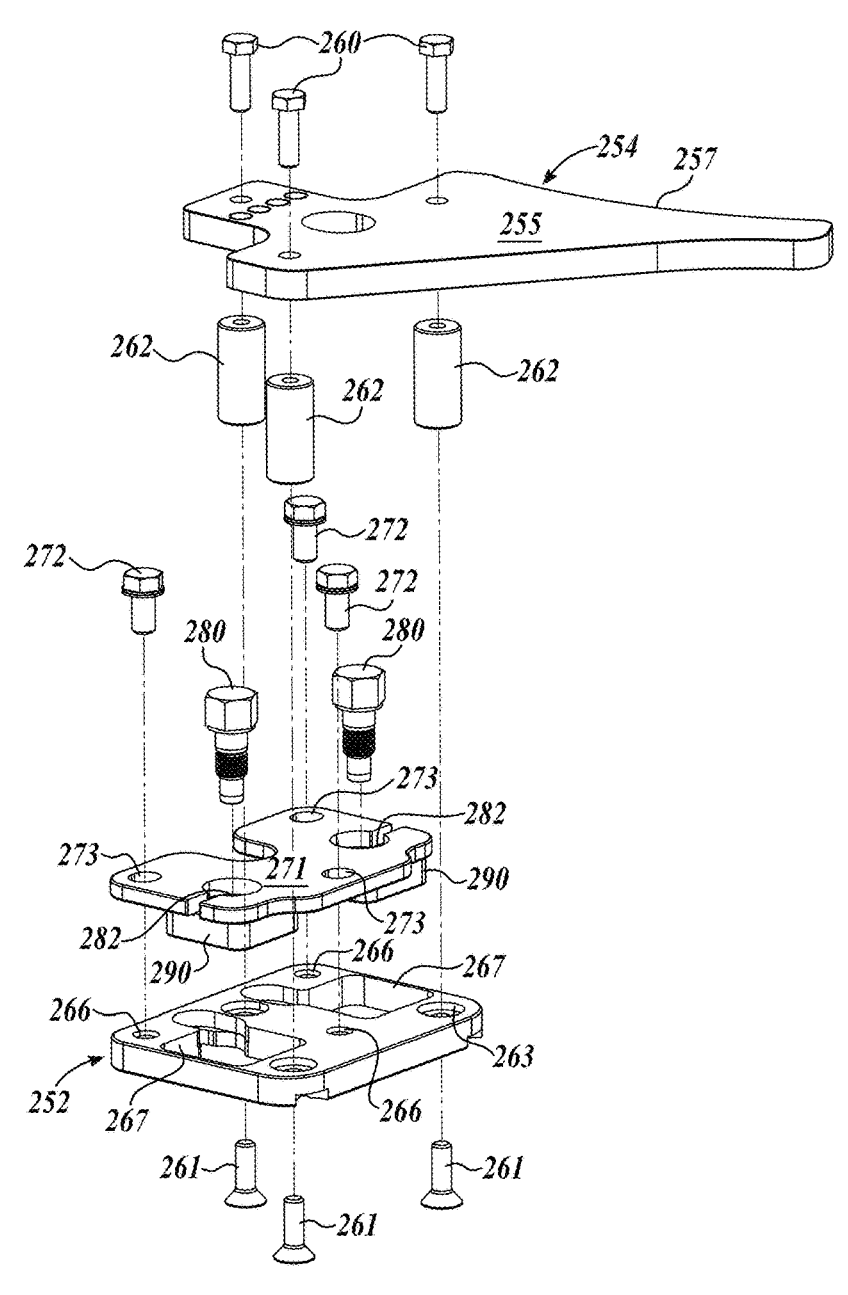

FIG. 23 is an exploded view of the replaceable rail assembly of FIG. 22.

Figures 24, 25:
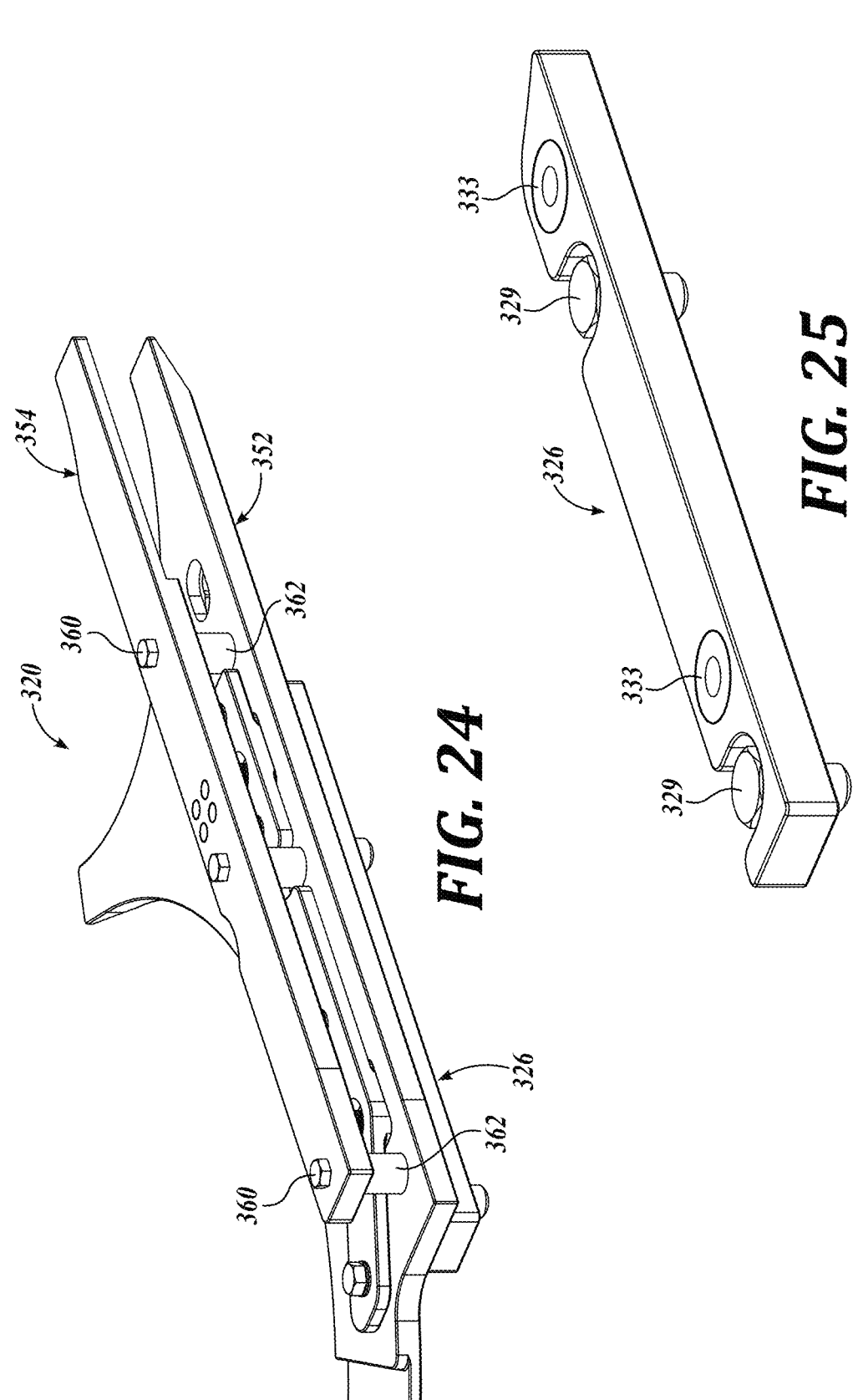

FIG. 24 is an isometric view, from above, of a can feed/discharge guide according to one embodiment of the present disclosure.

FIG. 25 is an isometric front view of the support plate of the can feed/discharge guide rail device of FIG. 24.

Figure 26:
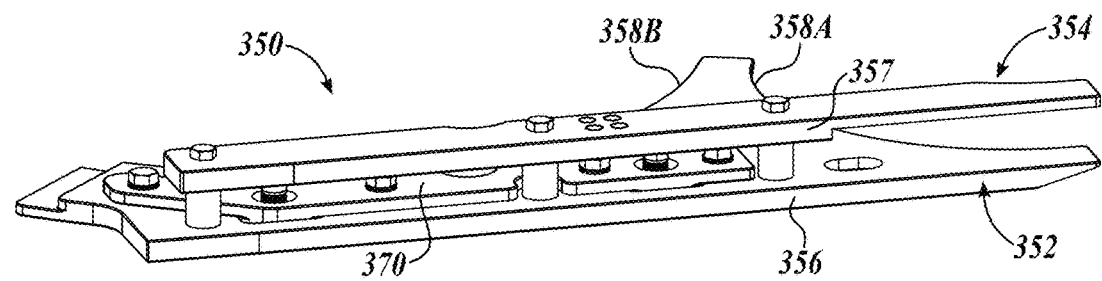

FIG. 26 is an isometric front view of the replaceable rail assembly of the can feed/discharge guide rail device of FIG. 24.

Figure 27:
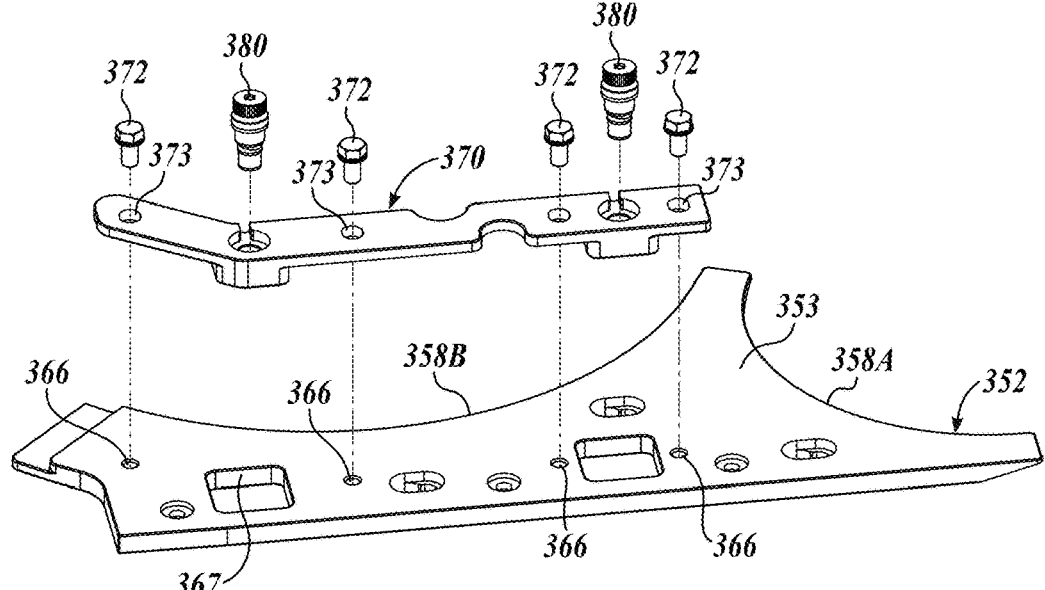

FIG. 27 is an exploded view of the replaceable rail assembly of FIG. 24.

Figure 28:
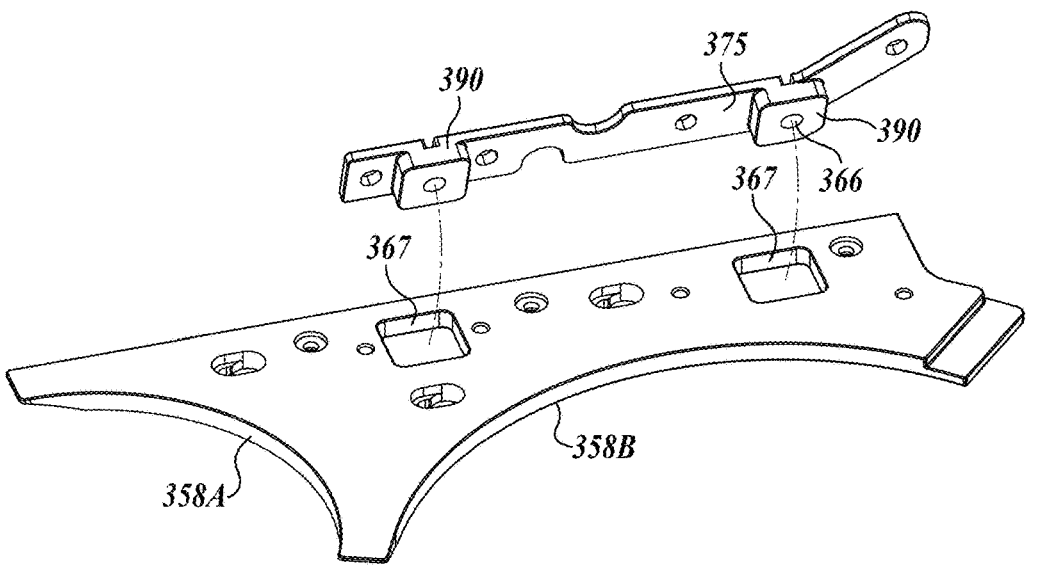

FIG. 28 depicts the adjustment plate and bottom rail of the can feed/discharge guide rail device of FIG. 24.

Figures 29, 30, 31A, 31B:
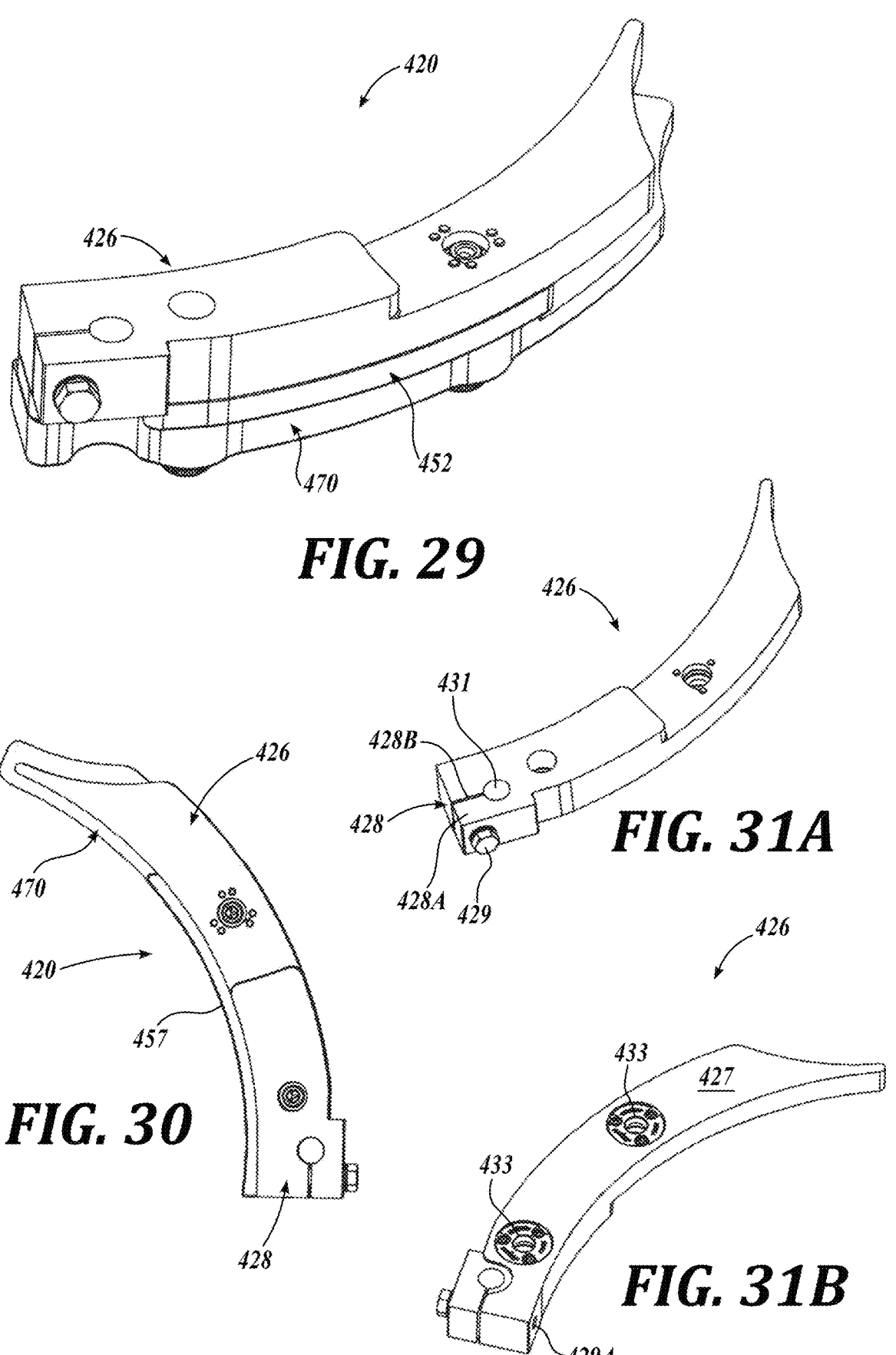

FIG. 29 is an isometric view, from above, of an upper discharge guide rail device according to one embodiment of the present disclosure.

FIG. 30 is an isometric bottom view the upper discharge guide rail device of FIG. 29.

FIG. 31A is an isometric view, from above, of the support plate of the upper discharge guide rail device of FIG. 29.

FIG. 31B is an isometric view, from below, of the support plate of the upper discharge guide rail device of FIG. 29.

Figure 32A:
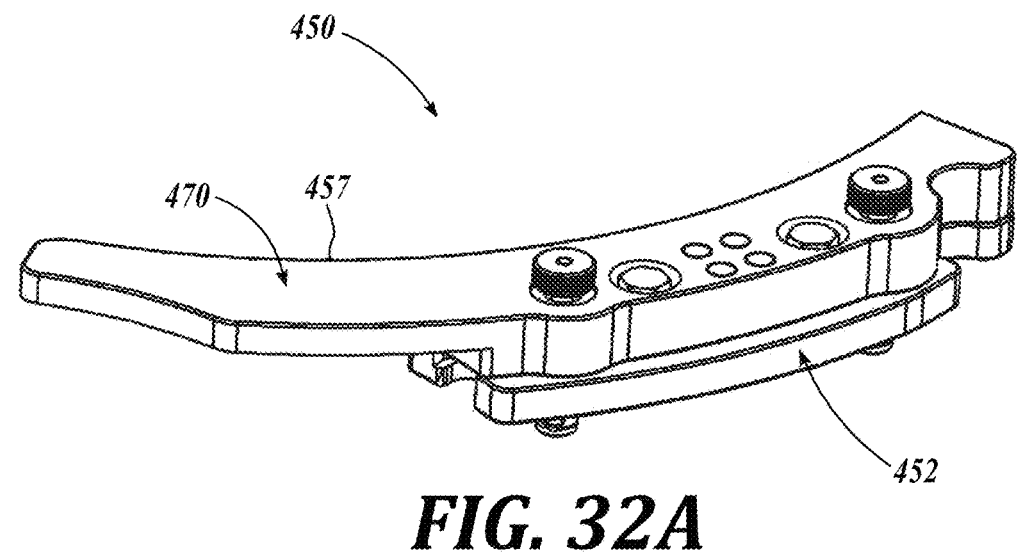

FIG. 32A is an isometric front view of the replaceable rail assembly of the upper discharge guide rail device of FIG. 29.

Figure 32B:
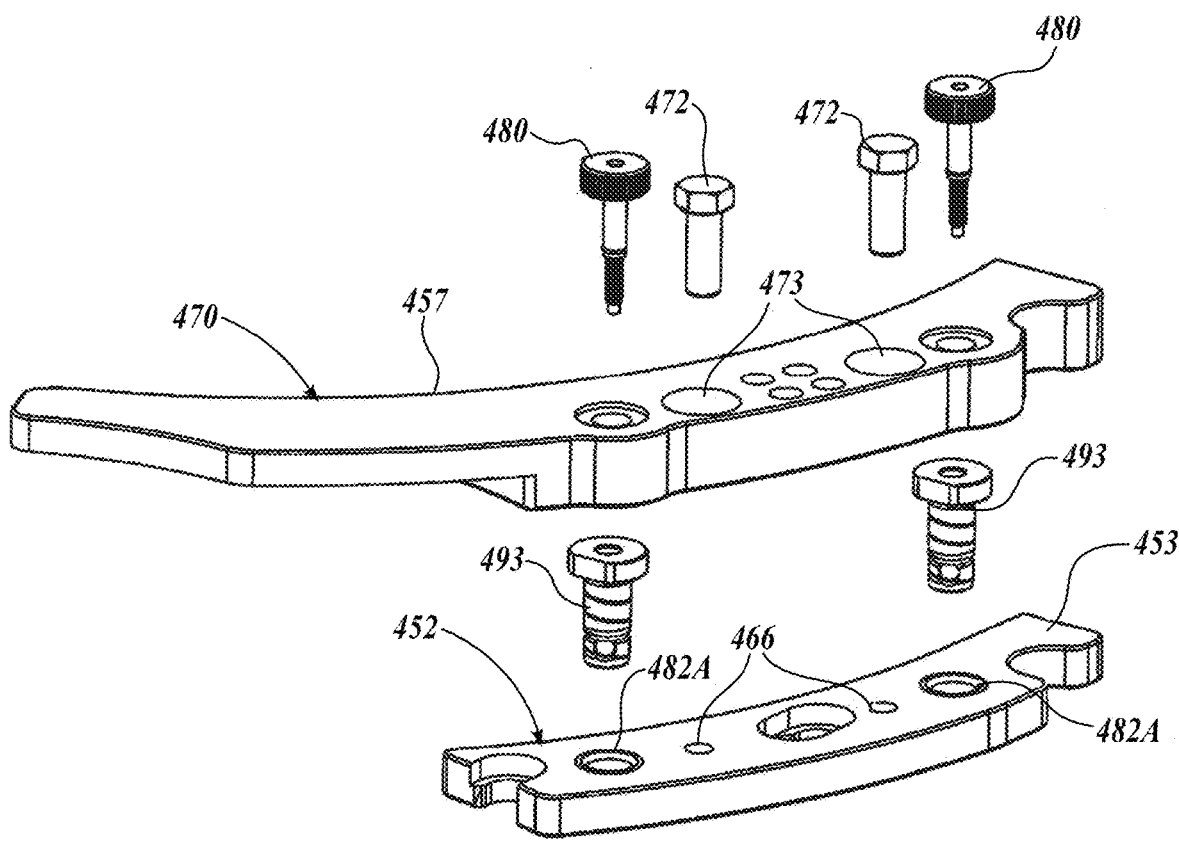

FIG. 32B is an exploded view of the replaceable rail assembly of FIG. 32.

Figures 33, 34:
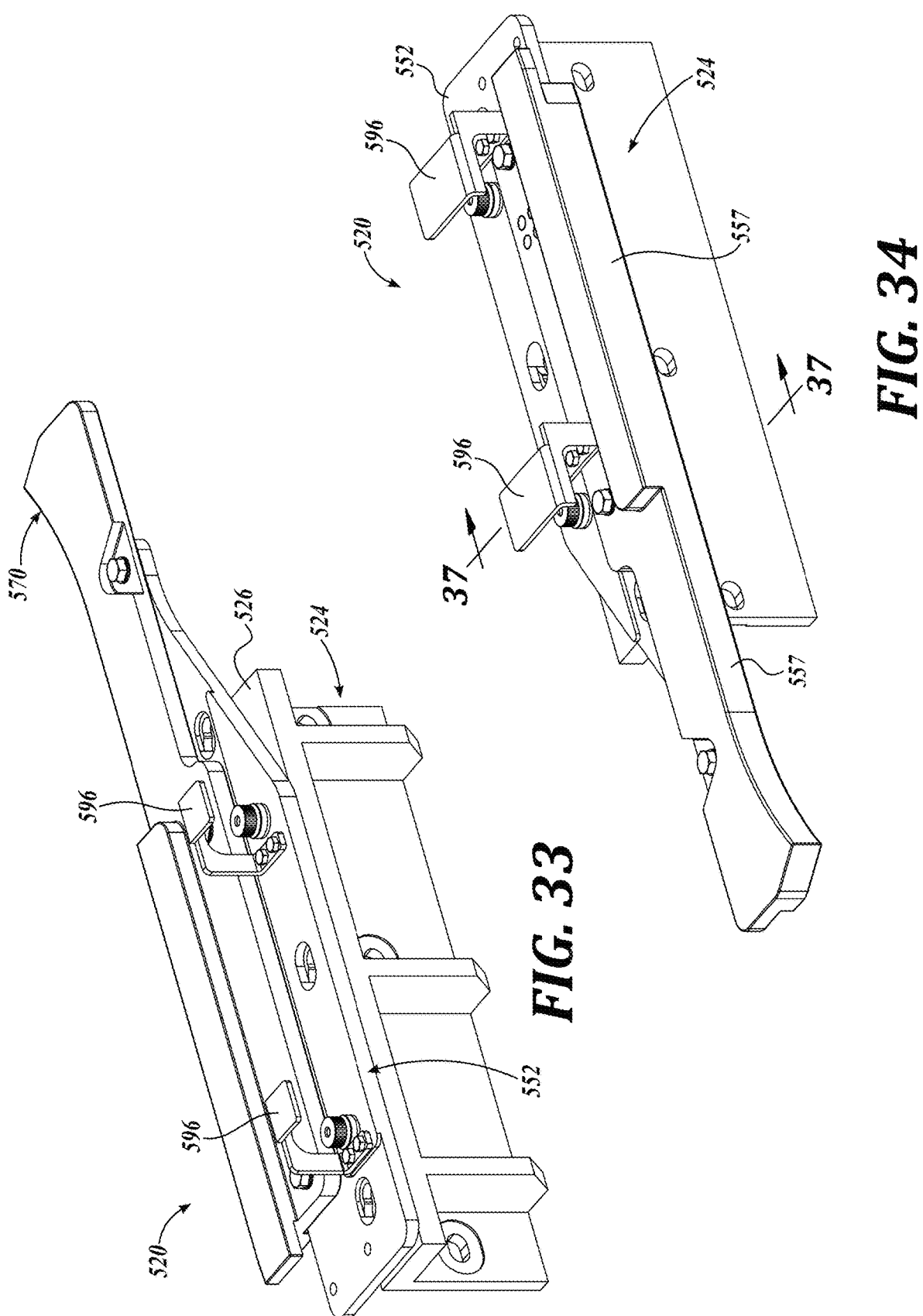

FIG. 33 is an isometric front view, from above, of an inlet guide rail device according to one embodiment of the present disclosure.

FIG. 34 is an isometric front view, from above, of an inlet guide rail device of FIG. 33.

Figures 35, 36, 36A:
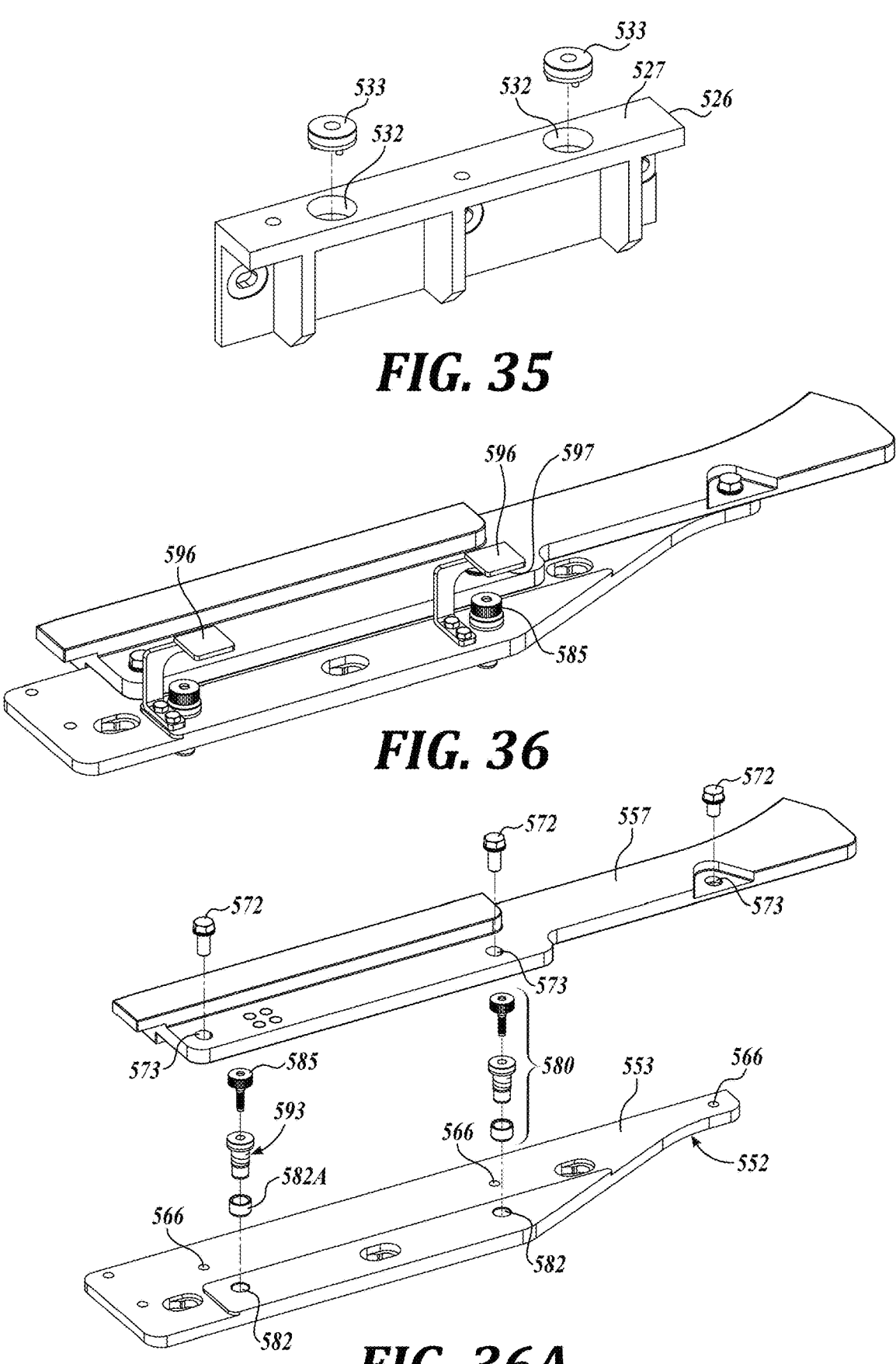

FIG. 35 is an isometric front view of the support plate of the inlet guide rail device of FIG. 33.

FIG. 36 is an isometric front view of the replaceable rail assembly of the inlet guide rail device of FIG. 33.

FIG. 36A is an exploded view of the replaceable rail assembly of FIG. 34.

Figures 37, 37A:
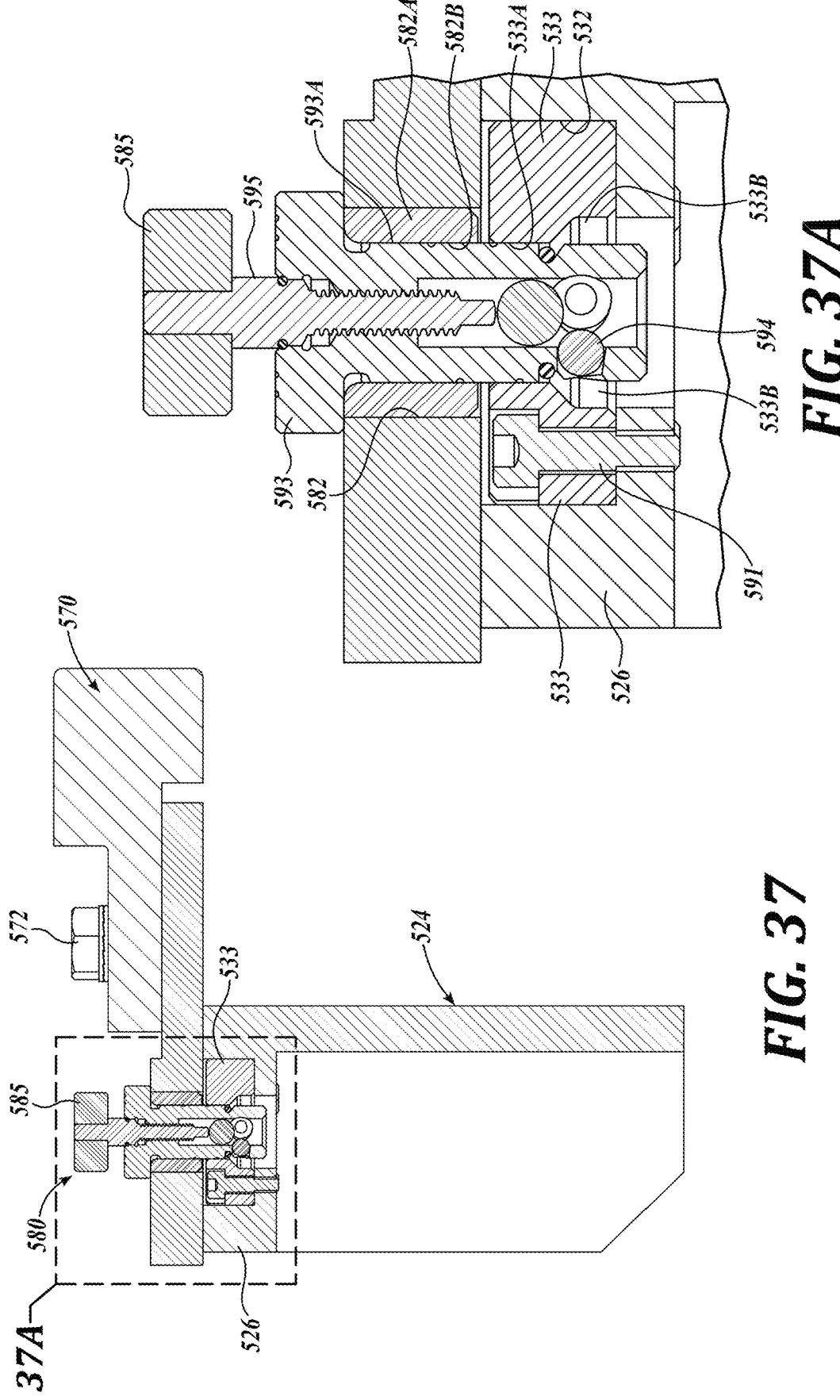

FIG. 37 is a cross-sectional view of the inlet guide rail device of FIG. 34, taken along the line 37-37 thereof, with hold-down brackets omitted FIG. 37A is an enlarged portion of FIG. 37.

Figure 38:
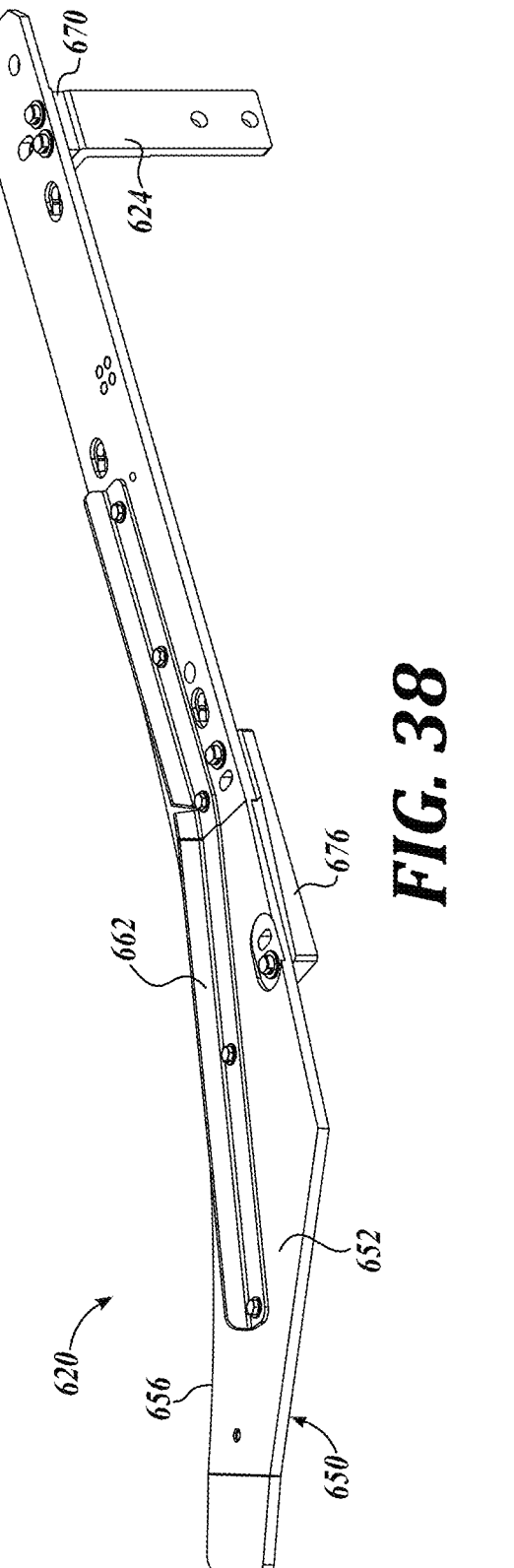

FIG. 38 is an isometric front view, from above, of a right filler guide rail device according to one embodiment of the present disclosure.

Figure 39:
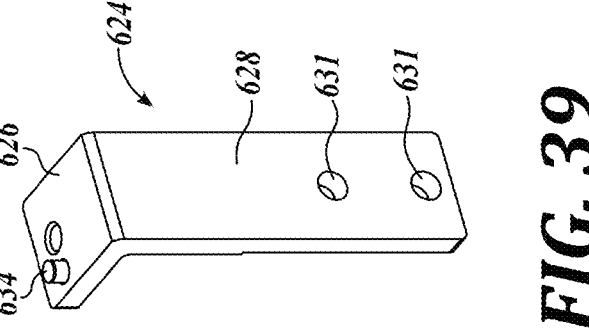

FIG. 39 depicts a base of the right filler guide rail device of FIG. 38.

FIG. 40 is an isometric front view of the replaceable rail assembly of the right filler guide rail device of FIG. 38.

FIG. 41 is a bottom view of the replaceable rail assembly of the right filler guide rail device of FIG. 38.

FIGS. 41A and 41B depict the mounting of the adjustment members to the bottom of the replaceable rail assembly of FIG. 41.

Figures 42, 43:
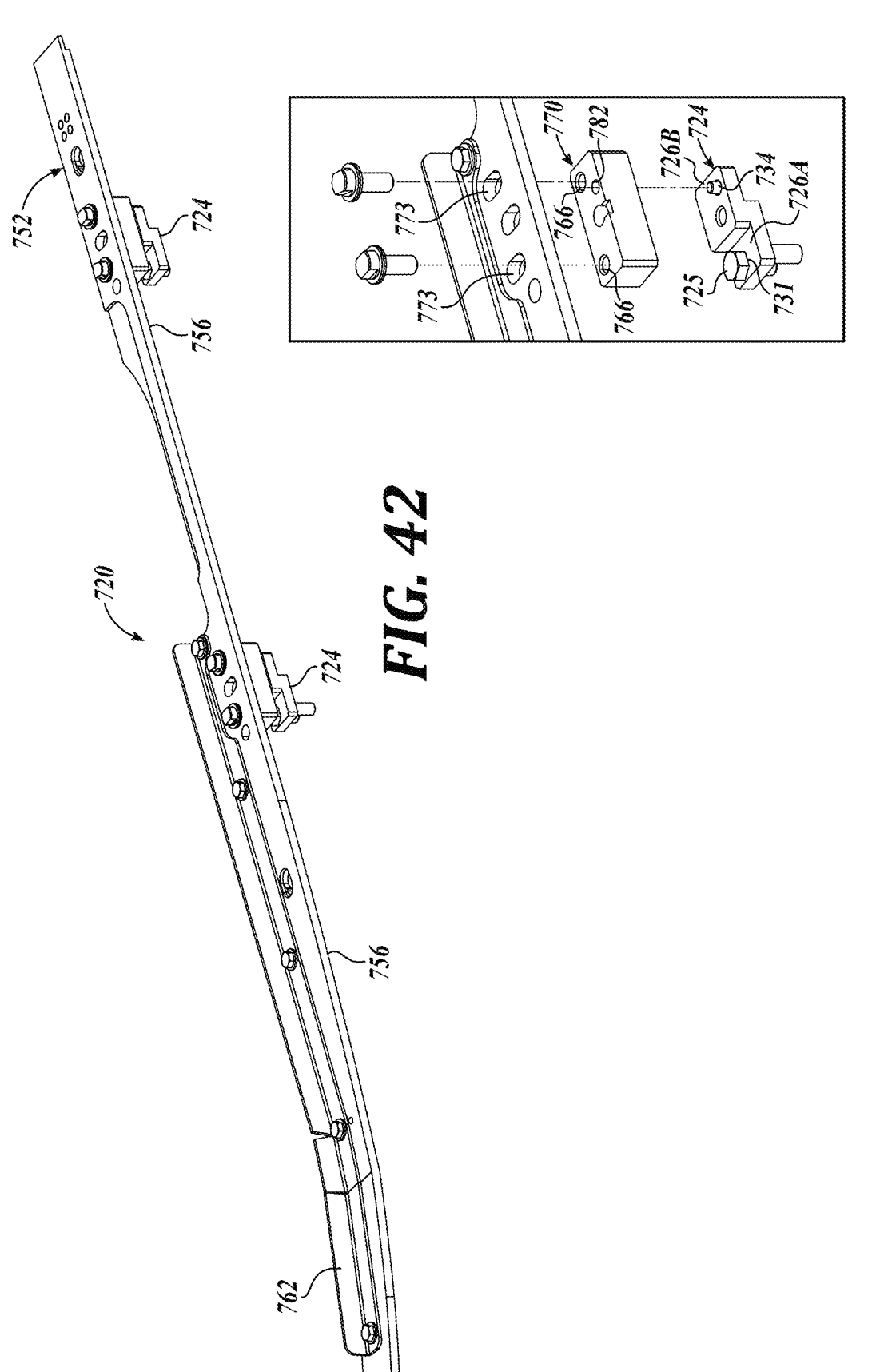

FIG. 42 is an isometric front view, from above, of a left filler guide rail device according to one embodiment of the present disclosure.

FIG. 43 is a bottom view of a portion of the left filler guide rail device of FIG. 42, depicting the mounting of the adjustment member to the base thereof.

The drawings are intended to illustrate rather than limit the scope of the present invention. Embodiments of the present invention may be carried out in ways not necessarily depicted in the drawings. Thus, the drawings are intended to merely aid in the explanation of the invention. Thus, the present invention is not limited to the precise arrangements shown in the drawings.

DETAILED DESCRIPTION

The following detailed description describes examples of embodiments of the invention solely for the purpose of enabling one of ordinary skill in the relevant art to make and use the invention. As such, the detailed description and illustration of these embodiments are purely illustrative in nature and are in no way intended to limit the scope of the invention, or its protection, in any manner. It should also be understood that the drawings are not to scale and in certain instances details have been omitted, which are not necessary for an understanding of the present invention.

Embodiments of the present disclosure provide quick change guide rail devices mountable to a container sealing line (e.g., a can seamer line) for controllably guiding moving containers (e.g., cans) moving through the container line. The guide rail devices may generally include a base (e.g., a support plate) mountable to the container sealing line, and a guide rail assembly securable to the base after the base is mounted to the container sealing line such that the guide rail assembly and base are self-aligning with respect to one another. This allows the guide rail assemblies to be swapped out without having to realign the new guide rail assembly. Each guide rail assembly can be pre-aligned such that, when secured to the base, no further alignment is needed.

Each guide rail assembly may include at least one guide surface (e.g., a first guide surface) adapted to controllably guide containers moving along a portion of the can sealing line. The guide rail assemblies may generally include:

a first member; and a second member, wherein the first and second members are adjustably attached to one another.

In some instances, the guide surface is provided on the first member, in which case the first member includes a guide rail. In other instances, the guide surface is provided on the second member, such that the second member includes a guide rail. In still further instances, the guide rail assembly includes a third member (a guide rail) attached to at least one of the first and second members. The third member (guide rail) can include the first (and only) guide surface, or a first guide surface can be provided on the first member (first guide rail) and a second guide surface provided on the third member (a second guide rail). Each guide rail assembly is securable to the base such that the first member is immediately adjacent the base with the second member separated from the base by the first member.

The first and second members are adjustably attached to one another such that the guide surface(s) can be properly aligned prior to attachment to the base, which is mounted to the sealing line. The adjustable attachment is provided by features on the first and/or second members such that one of these members is in the form of an adjustment member (e.g., an adjustment plate). For example, when the first member is a guide rail having a guide surface, the second member includes an adjustment plate. In still further embodiments, the adjustment member can be in the form of a guide rail (as the first member) having features enabling the adjustable attachment of the guide rail to the second member (which becomes an intermediate plate, also referred to as a center plate).

The guide rail devices can include various features for providing adjustable attachment of the first and second members. For example, in some embodiments the guide rail assembly further includes a plurality of adjustment fasteners for adjustably attaching the first and second members to each other. In some specific embodiments, one of the first and second members includes a plurality of enlarged adjustment apertures through which the adjustment fasteners extend. The adjustment apertures have an inner diameter greater than the diameter of the adjustment fasteners. The other of the first and second members includes a plurality of receiving apertures alignable with the adjustment apertures of the first member, with the receiving apertures adapted to receive the adjustment fasteners therein for adjustable attachment of the first and second members.

As mentioned, the guide rail assembly can include a third member (as a guide rail) attached to at least one of the first and second members. The first and third members can be secured to one another in a spaced-apart relationship, with the second member located between the first and third members. Alternatively, the second and third members can be secured to one another in a spaced-apart relationship.

In some embodiments, the base includes a planar support plate having a support surface. The guide rail assembly is securable to the base such that the first member is in contact with the support surface of the base, with the second member separated from the base by the first member.

The guide rail assembly can further include a plurality of mounting fasteners for non-adjustably securing the guide rail assembly to the base. By way of example, in some embodiments each of said mounting fasteners extends through an aperture in the first member and is retained on the guide rail assembly. The base includes a plurality of apertures for receiving the mounting fasteners therein for non-adjustably securing the guide rail assembly to the base. In some instances, each of said mounting fasteners includes a mounting bolt having a shaft comprising an upper portion, a threaded middle portion extending from the upper portion, and a lower portion extending from the middle portion. In these examples, the base includes a plurality of mounting apertures for receiving the mounting fasteners therein for non-adjustably securing the guide rail assembly to the base, with the mounting apertures extending from the support surface of the base. Each of the receiving apertures in the base includes an internally threaded first portion adapted for threadably receiving the middle portion of a mounting fastener, and a second guide portion adapted for receiving the lower portion of a mounting fastener for securing the guide rail assembly to the base.

In some embodiments, the second member includes at least one projection extending from the bottom surface thereof, and the first member includes at least one projection configured to matingly receive said at least one projection therein.

As used herein, the term "hole" is intended to encompass apertures and other passageways for receiving a fastener or other attachment device or structure. Unless otherwise indicated or required, a blind hole can be used in place of a through hole, and a through hole can be used in place of a blind hole. Similarly, any of a variety of fasteners can be used for attaching the various components described herein, including threaded fasteners (e.g., threaded bolts). In addition, when a threaded fastener is passed through holes on two components for fastening purposes, unless otherwise indicated or required, either or both of the holes used to receive a fastener can be threaded. Alternatively, or in addition thereto, unless otherwise indicated or required, separate threaded nuts, connectors, and/or threaded inserts can be used to secure a threaded fastener within holes on two components affixed to one another. It will also be understood that, unless otherwise indicated or required, components described herein can be affixed to one another in a variety of alternative ways (or in addition to threaded fasteners), such as by welding (unless the context requires that two components are removably affixed to one another).

As also used herein, the term "frame" refers to the support structure or framework of a container sealing line. The frame is not necessarily a unitary structure. In the embodiment shown in the figures, the frame (12) includes various supports, castings, housings, walls, panels, and other structures that form the sealing line (including, for example, a seamer) and operably support the various components of the sealing line (e.g., various turrets, container conveyors, motors, seaming mechanisms, and other components of the sealing line).

FIGS. 1A-1E are schematic illustrations of a container sealing line (10) for sealing container ends (e.g., lids) to containers (e.g., cans) filled with product (e.g., a beverage or other liquid). In the particular embodiment shown, the container sealing line is a container seaming line wherein filled containers are sealed by seaming a container end to an open end of a filled container. The container seaming line (10) is located downstream of a product filler (not shown), and it is used to seam container ends to the open end of the containers after the containers have been filled with product. Filled containers, in this example cans (C), are transported at high speed along a moving chain conveyor (CV), in the directions shown in FIG. 1A, with various guide rails controllably directing the cans to a seamer. The seamer includes a rotating seaming turret (ST), a rotating feed turret assembly (FT in FIG. 1C, but omitted in FIG. 1A), and a rotating discharge turret assembly (DT). Other components of the seamer have been omitted for clarity (e.g., the seamer housing, motors, seaming mechanisms comprising seaming levers, chucks, rolls, and seaming cam, etc.).

In the seamer (a can seamer in the example shown), a container end (e.g., a can lid, not shown) is positioned directly above the open container when the container enters an arcuate pocket (P) of the feed turret assembly (FT) (see FIG. 1C), adjacent the seamer turret (ST). Purge gas (e.g., $CO_2$) is directed across the headspace between the container end and the surface of the product within the container in order to purge air from the container immediately prior to sealing. A mechanism (not shown) above the seaming turret then seals the container end to the container (e.g., by crimping the outer periphery of the container end to the can flange at the open end of the container). The discharge turret assembly (DT) then receives the sealed containers from the seamer turret and directs the containers to further processing and/or packaging.

Containers, including beverage cans, are available in a variety of sizes, including a variety of heights and diameters. Additionally, container seaming lines often are not dedicated for use with only one size of container. When it is desired to change a container seaming line (10) to accommodate a different container size, it is necessary to change various components of the seaming line, including not only the turrets but also one or more of the guide rails to the appropriate size for the containers. This changeover process is time-consuming, as the components tend to be heavy, awkward to manipulate, and/or difficult to reach on the seaming line. Replacement of the guide rails requires that each guide rail is individually, and precisely adjusted for alignment with the conveyor and to ensure that the containers are guided properly at high speed. If one guide rail is misaligned, the entire container sealing line can quickly jam and become unusable until the misalignment is corrected. Guide rails are often quite heavy, making manipulation and alignment more difficult.

The guide rail devices and guide rail assemblies further described herein facilitate easier changeovers, such as by shortening the time required for changing guide rails. In some instances, guide rails can be changed without the need to realign the guide rails after a change.

While the embodiments of the present disclosure will be described in connection with a can seamer used to affix lids to the open ends of cans filled with a beverage, it will be understood that the present disclosure is not limited to seaming lids to beverage cans.

In the exemplary embodiment shown in FIGS. 1A-1E, container seaming line (10) includes right and left filler guide rails (620, 720), also known as sweep rails, for guiding cans as the cans move along a chain conveyor (CV) located between the filler guide rails. The filler guide rails maintain the cans centered on the conveyor as the cans travel from the filler (not shown) to the seamer. Right and left can feed extension rails (RCFE, LCFE) are located downstream of the filler guide rails. It is typically not necessary to change the RCFE and LCFE during a can size changeover, as these rails can be adjusted to handle a wide range of can sizes and are easily adjustable after the adjacent rails have been mounted and are properly aligned. However, the RCFE and LCFE can alternatively be configured similar to the guide rails described herein.

An inlet guide rail device (520) is located in opposition to a can feed/discharge guide rail device (320), for receiving and guiding cans therebetween and directing the cans into the position at makeup between the feed turret (FT) and seaming turret (ST). Cans leaving the seaming turret are directed by outer discharge guide (220) towards upper discharge guide rail device (420) and can feed/discharge cans immediately downstream thereof and adjacent the discharge turret. Finally, seamed cans leaving the discharge turret are received and guided between inner conveyor discharge guide rail device (20) and outer conveyor discharge guide rail device (120).

The inner conveyor discharge guide rail device (20) is depicted in FIGS. 2-16, and generally includes a base (24) and an inner conveyor discharge guide rail assembly (50) having a bottom rail (52) secured in spaced-apart relationship to a top rail (54). Inner conveyor discharge guide rail device (20) is mounted to the container sealing line for controllably guiding seamed cans leaving the discharge turret, directing the cans to further processing and/or packaging (not shown). The outer conveyor discharge guide rail device (120) is positioned opposite the inner conveyor discharge guide rail device (20) (see FIG. 1E), for guiding cans therebetween. A lower portion of the cans (C) contacts a guide surface (56) of the bottom rail (52), and an upper portion of the cans (C) contacts the guide surface (57) of the top rail (54) (see FIGS. 1C and 1E).

Figure 1A:
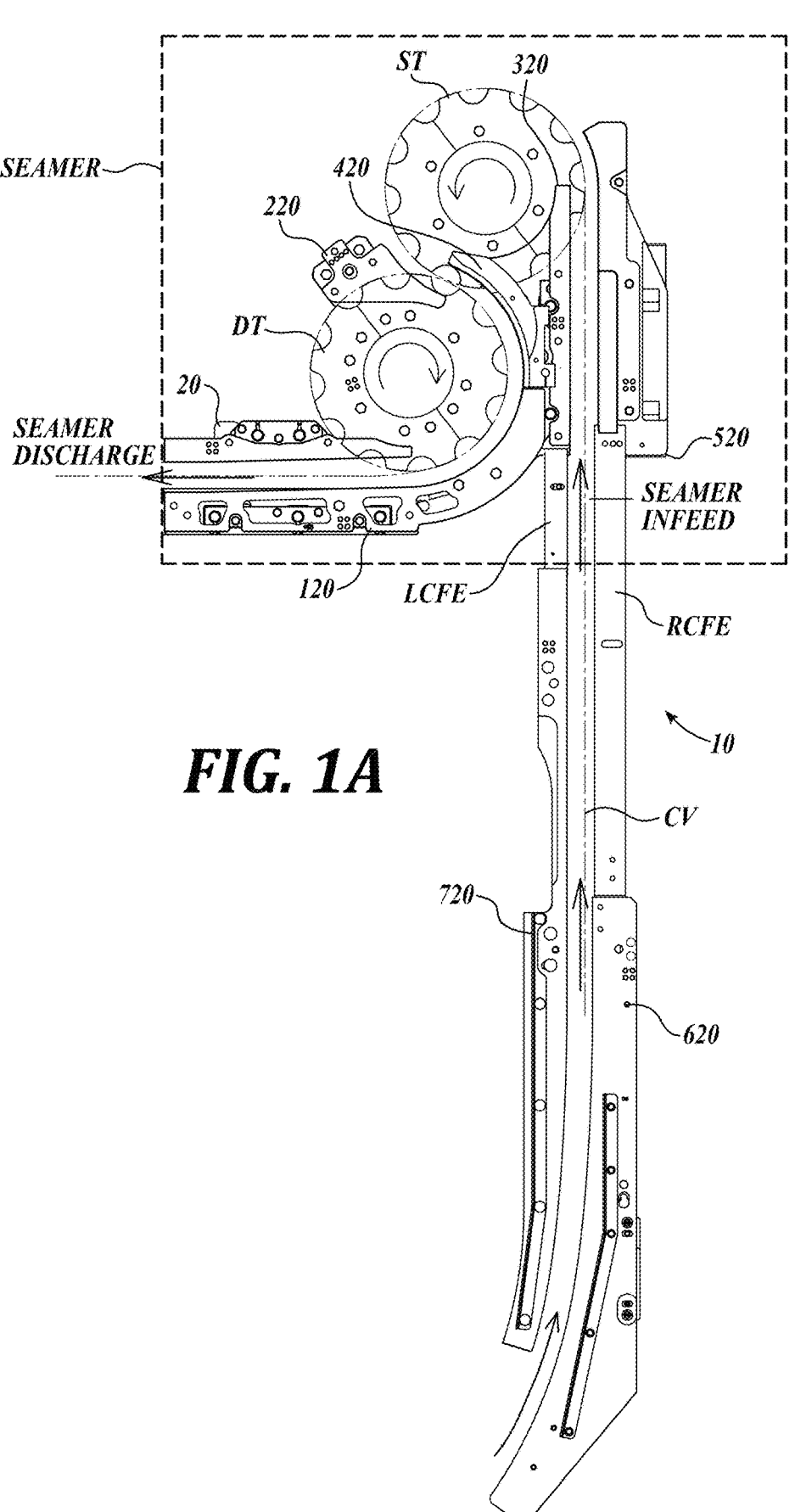
FIG. 1A is a schematic, overhead view of a segment of a can seaming line wherein portions of the can seamer have been omitted for clarity.
Figure 1B:
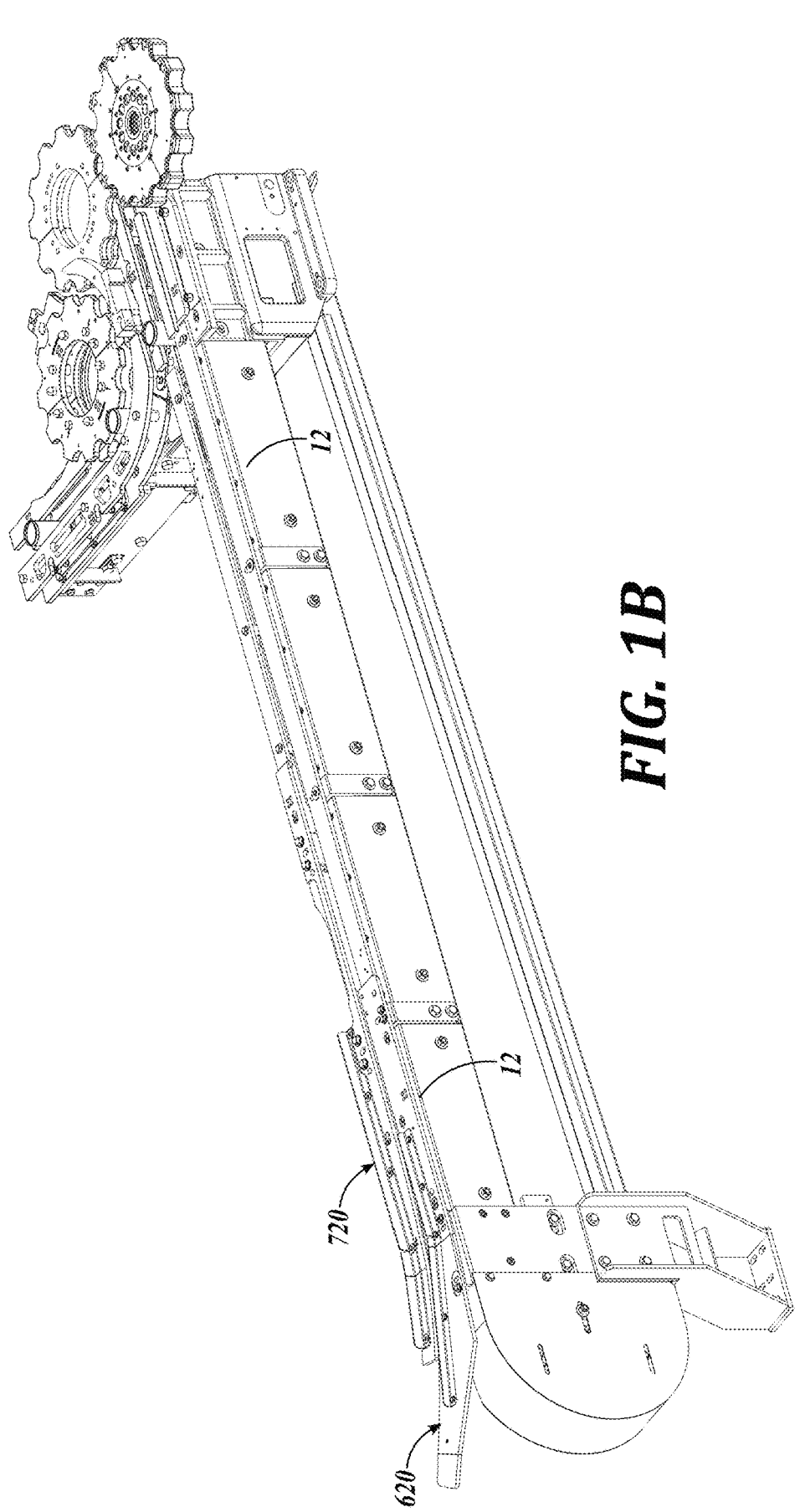
FIG. 1B is a schematic view of the canning line segment of FIG. 1.
Figure 1C:
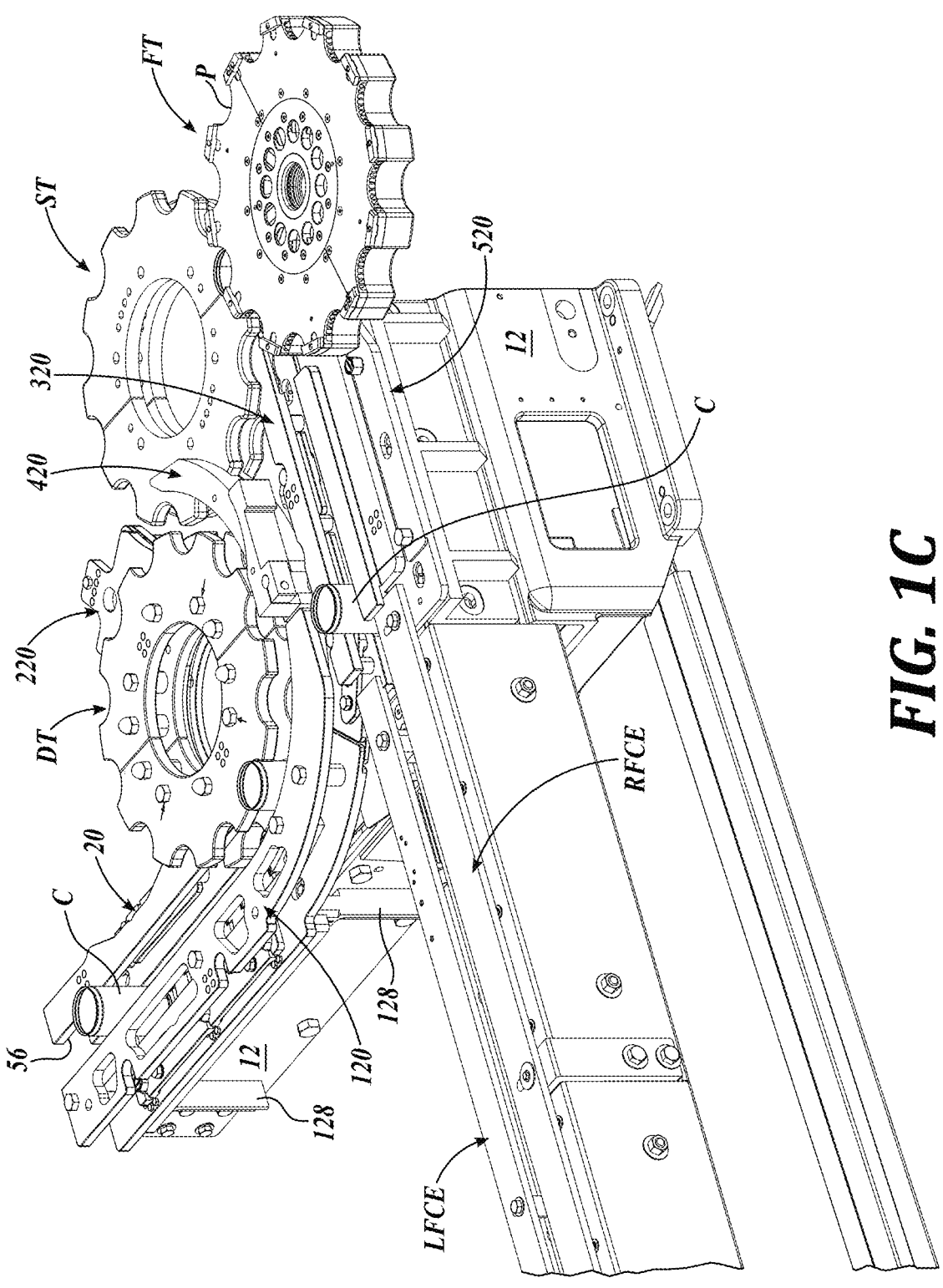
FIG. 1C is a front schematic view of a seamer portion of the canning line segment of FIG. 1.
Figure 1D:
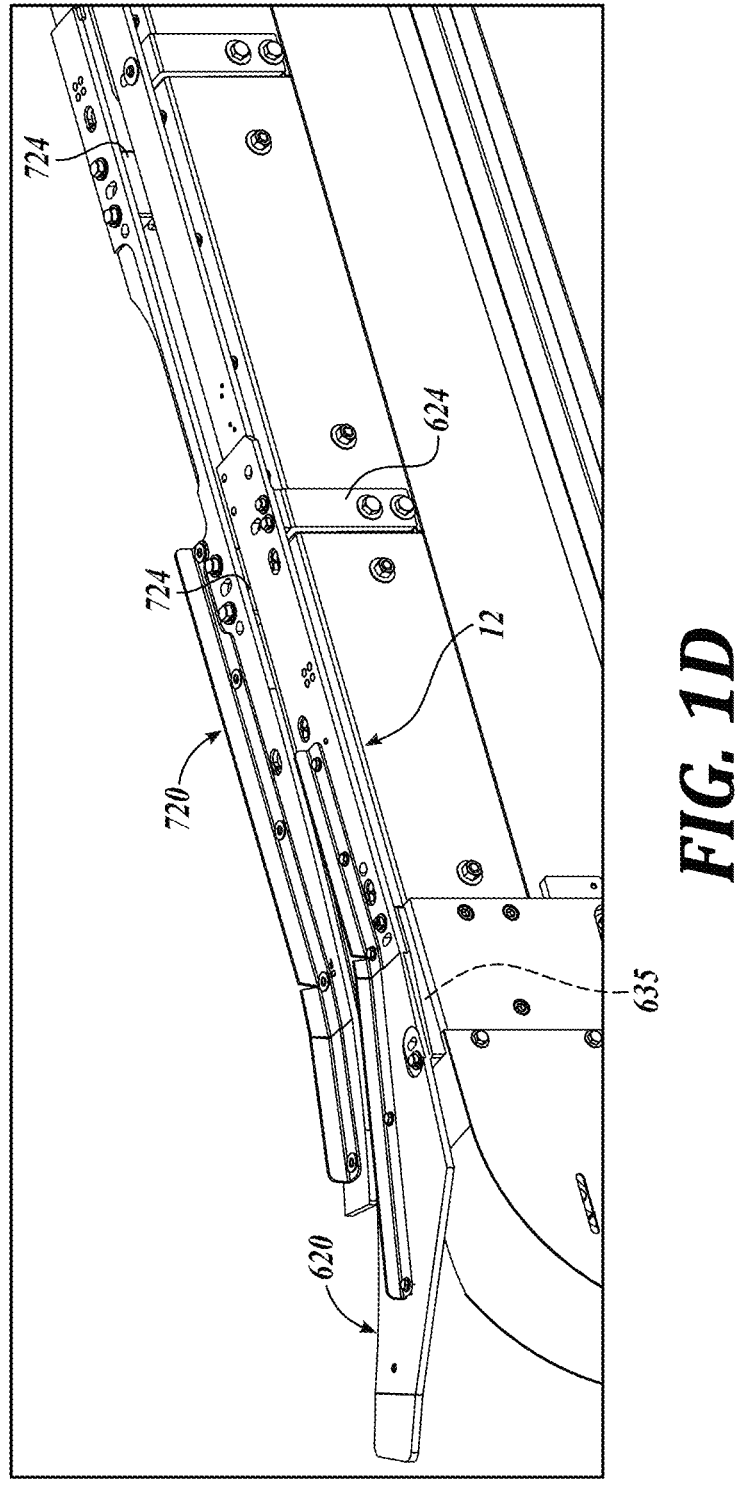
FIG. 1D is a front schematic view of an infeed portion of the canning line segment of FIG. 1.
Figure 1E:
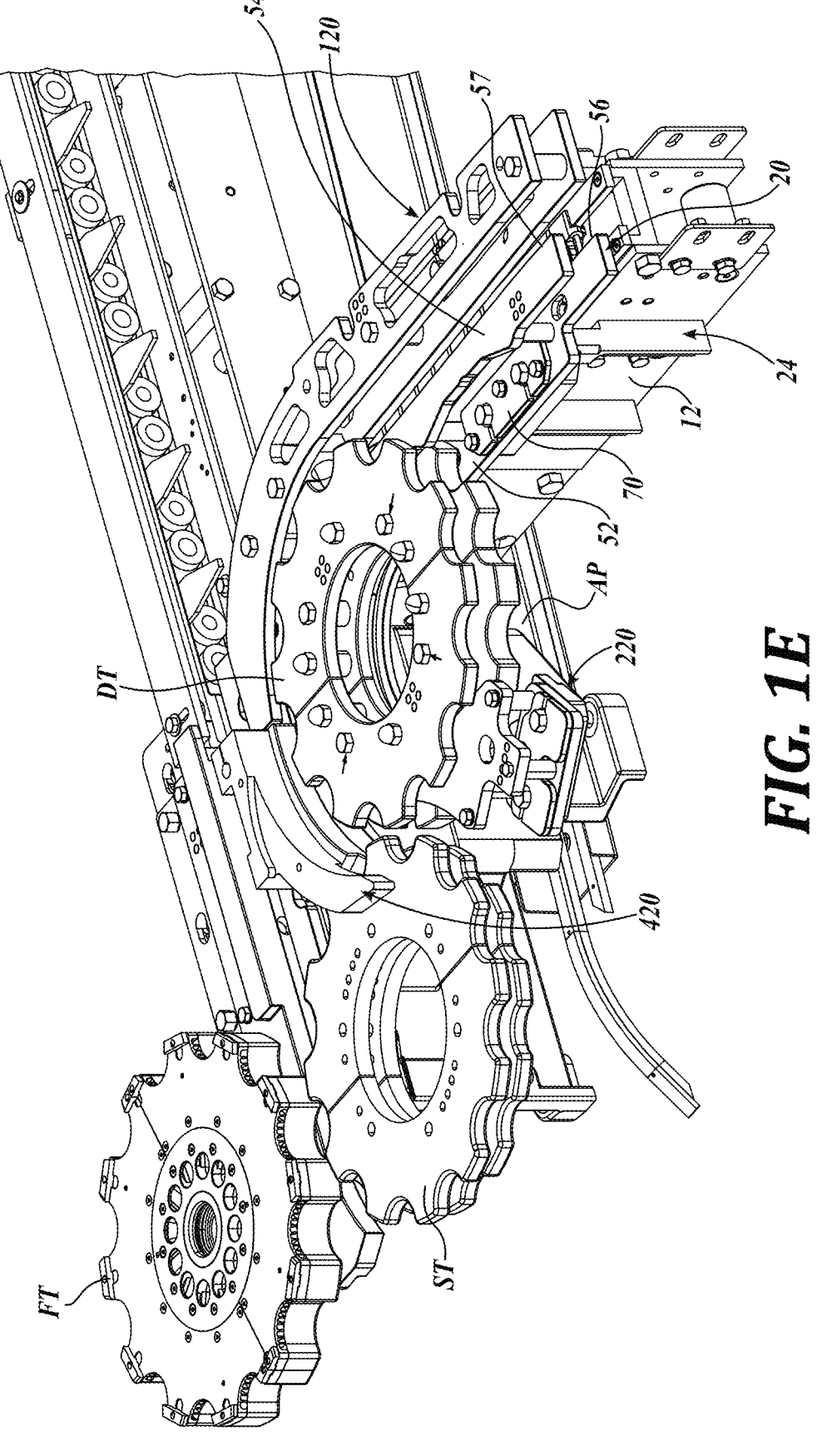
FIG. 1E is a rear schematic view of a seamer portion of the canning line segment of FIG. 1.
Figure 2:
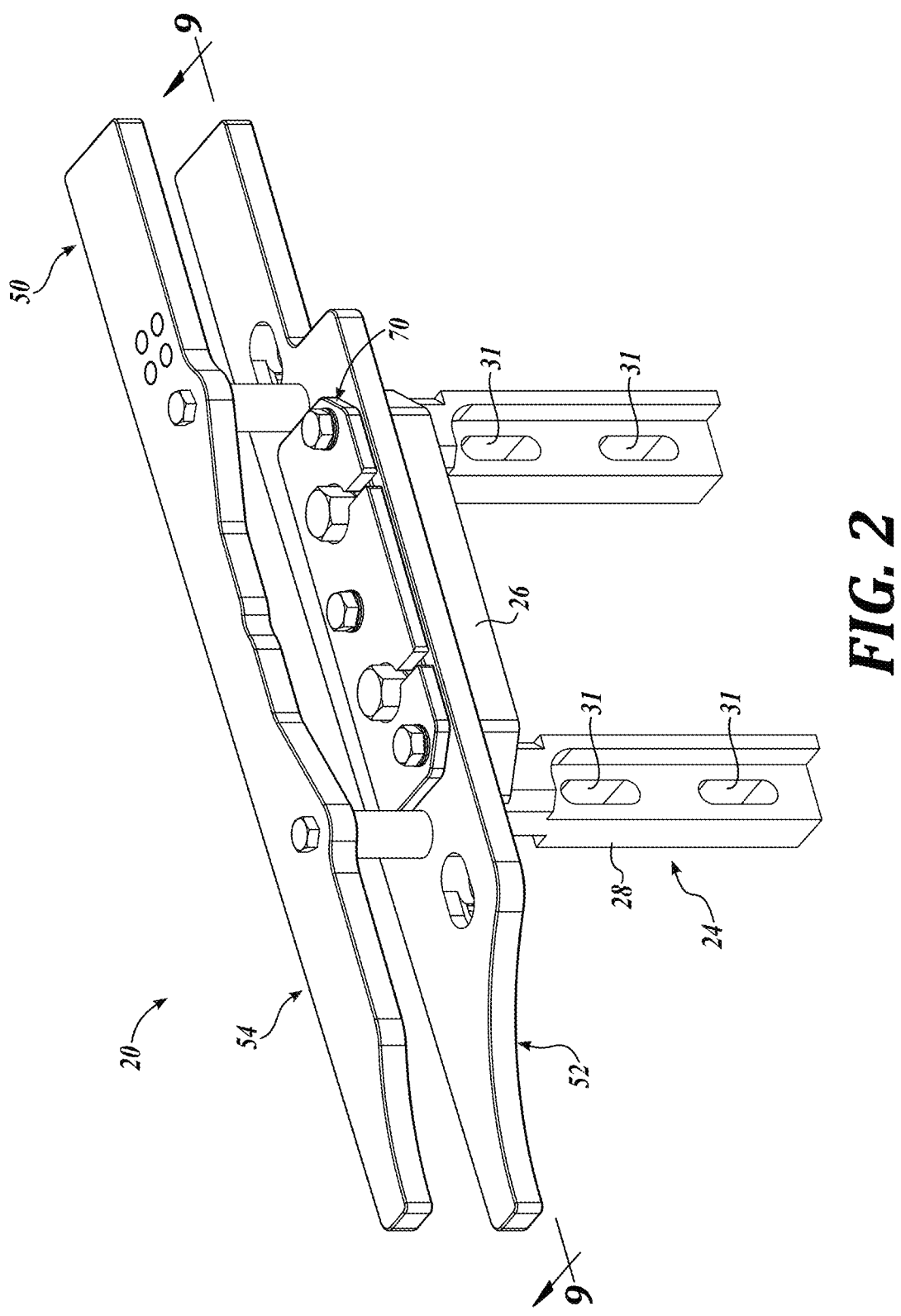
FIG. 2 is an isometric view, from above, of an inner conveyor discharge guide rail device according to one embodiment of the present disclosure.
Figure 3:
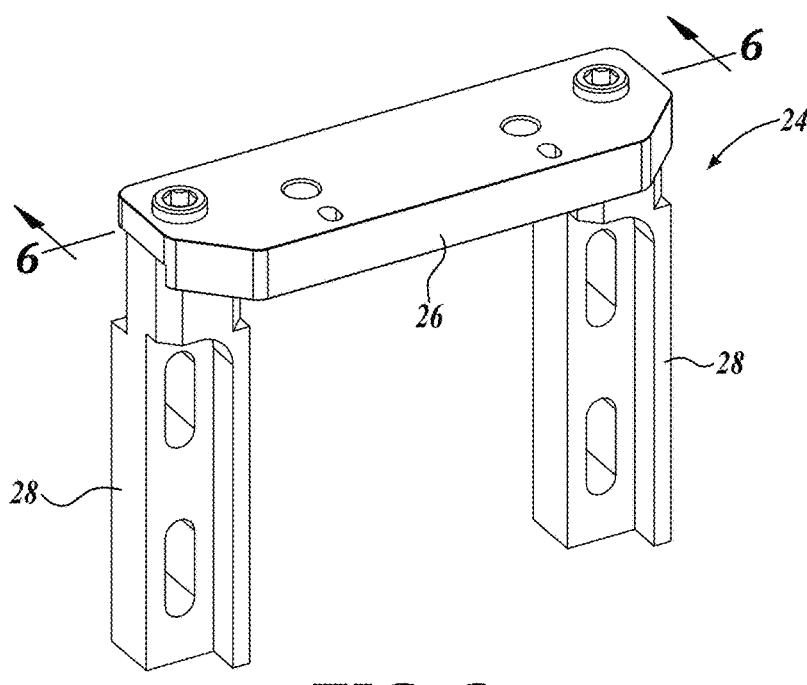
FIG. 3 is an isometric front view of the base of the inner conveyor discharge guide rail device of FIG. 2.
Figure 4:
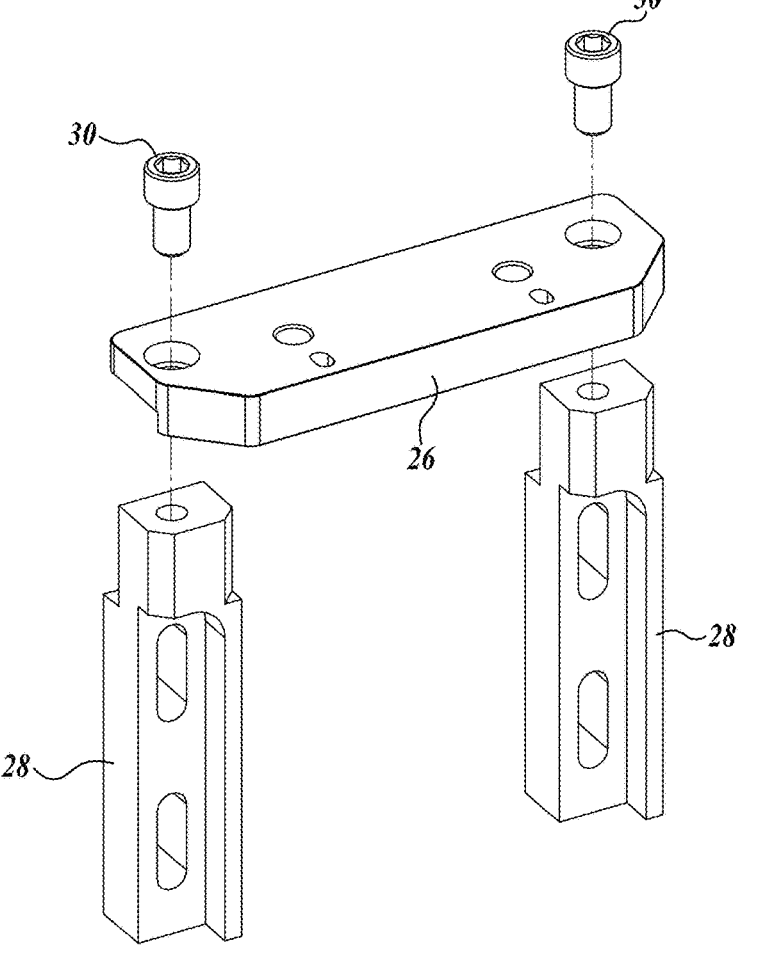
FIG. 4 is an exploded view of the base of FIG. 3.

The base (24) is adapted to be fixedly attached to a frame (12) of the sealing line, as best seen in FIG. 1E. The base (24) includes a support plate (26) and a mounting section for attaching the base to the frame (12). In the example shown, the mounting section includes a pair of mounting rails (28) extending downwardly from opposite ends of the support plate (26). While the base (24) can include a unitary structure (e.g., fabricated as single structure), in the depicted embodiment, the mounting rails (28) are attached to the support plate (26) using threaded fasteners 30 (e.g., threaded bolts extending through holes in the support plate and received in threaded apertures in the upper ends of the mounting rails).

Each of the mounting rails (28) is adapted for attachment to a frame (12) of a seaming line, as best seen in FIG. 1E. In the embodiment shown, each mounting rail includes a pair of elongate apertures (31) for mounting the base (24) to the frame (12). It will be understood that any number of apertures can be provided in the mounting rails (28), or the rails can be configured in a variety of other ways for attachment to the frame. The elongate apertures (31) in each mounting rail (28) extend vertically and are substantially vertically aligned with one another. The apertures are adapted to receive threaded fasteners for mounting the base (24) to the frame (12), as seen in FIG. 1E. The elongated nature of the apertures (31) allow the base to be vertically adjusted on the frame (12) so that the support plate (26) is positioned at the appropriate height.

Once the base (24) is attached to the frame, the inner conveyor discharge guide rail assembly (50) can be affixed to the base (24), without the need to adjust the guide rail assembly (50) or the position of the base (24). As described further herein, proper alignment of the guide rail assembly (50) with respect to the frame (12) is accomplished by manipulation of the guide rail assembly itself rather than altering the position of the base. This feature allows the guide rail assembly (50) to be quickly changed (e.g., to a guide rail assembly accommodating a different size can), as the base (24) remains fixedly attached to the frame (12) during changeover, and the base and guide rail assembly are self-aligning with respect to each other.

Figure 5:
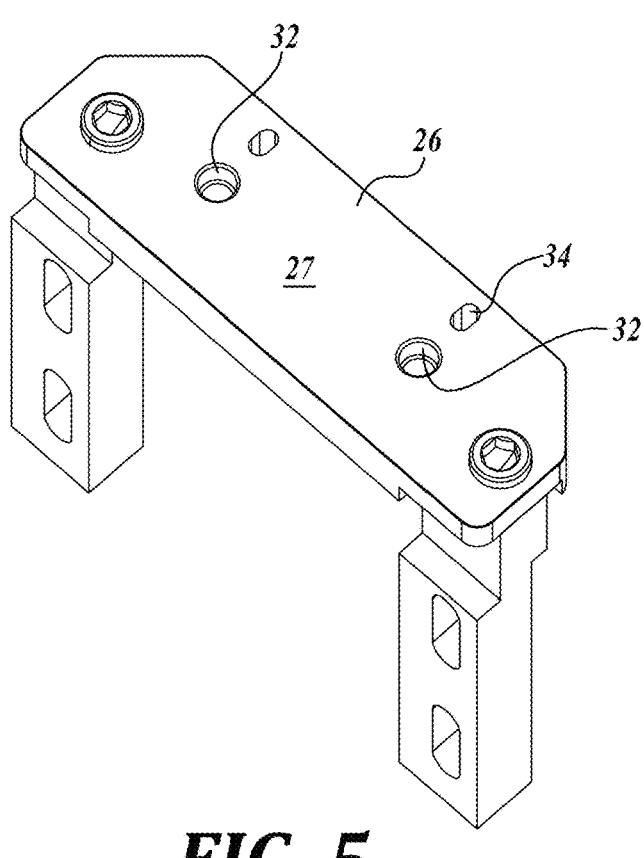
FIG. 5 is an isometric top view of the base of the inner conveyor discharge guide rail device of FIG. 2.
Figure 6:
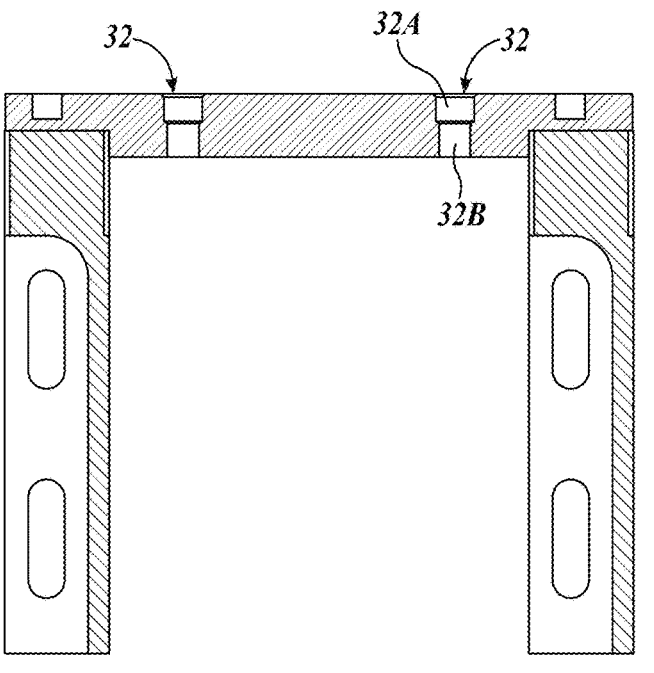
FIG. 6 is a cross-sectional view of the base of FIG. 3, taken along the line 3-3 thereof.

As best seen in FIGS. 5 and 6, support plate (26) includes a pair of stepped apertures (32) extending orthogonally from the planar upper surface (27) towards the bottom surface of the plate. The stepped apertures include an internally threaded first portion (32A), and a second guide portion (32B) having a smaller diameter and located below the first portion (32A). As further explained herein, stepped apertures (32) are used to guide the mounting of the guide rail assembly (50) to the base (24), as fasteners on the guide rail assembly are received within the stepped apertures (32). It will be understood that other arrangements can be used to direct the mounting of the guide rail assembly to the base and attach the guide rail assembly to the support plate (26).

A pair of through holes (34) in the support plate (26) are also shown, and serve as drainage holes. These drainage holes (34) allow for liquids to be drained from the horizontal surface of the support plate (26) in order to facilitate cleaning and avoid bacterial growth and contamination (particularly when the container sealing line is used for beverages and the like). It will be understood that similar drainage holes may be provided in various other components of the guide rail devices of the present disclosure, particularly in flat surfaces that are positioned horizontal during use.

Figure 7:
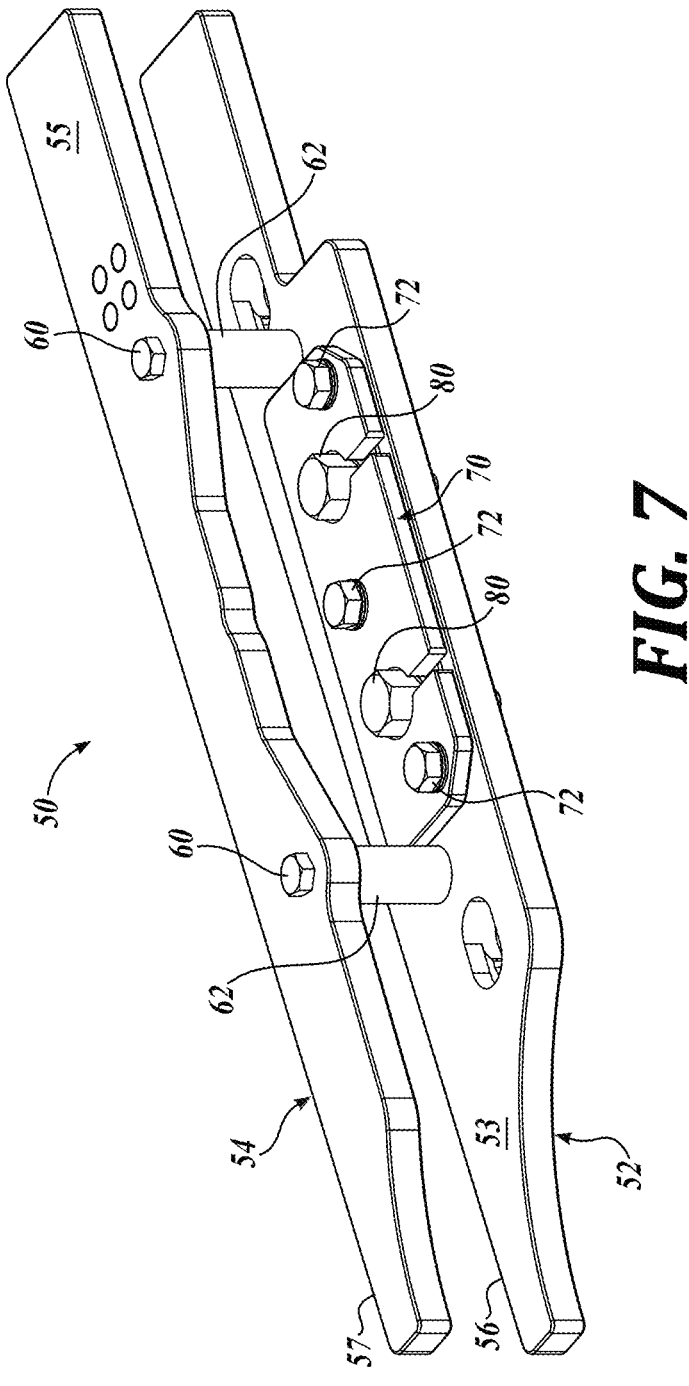
FIG. 7 is an isometric front view of the replaceable rail assembly of the inner conveyor discharge guide rail device of FIG. 2.
Figure 8:
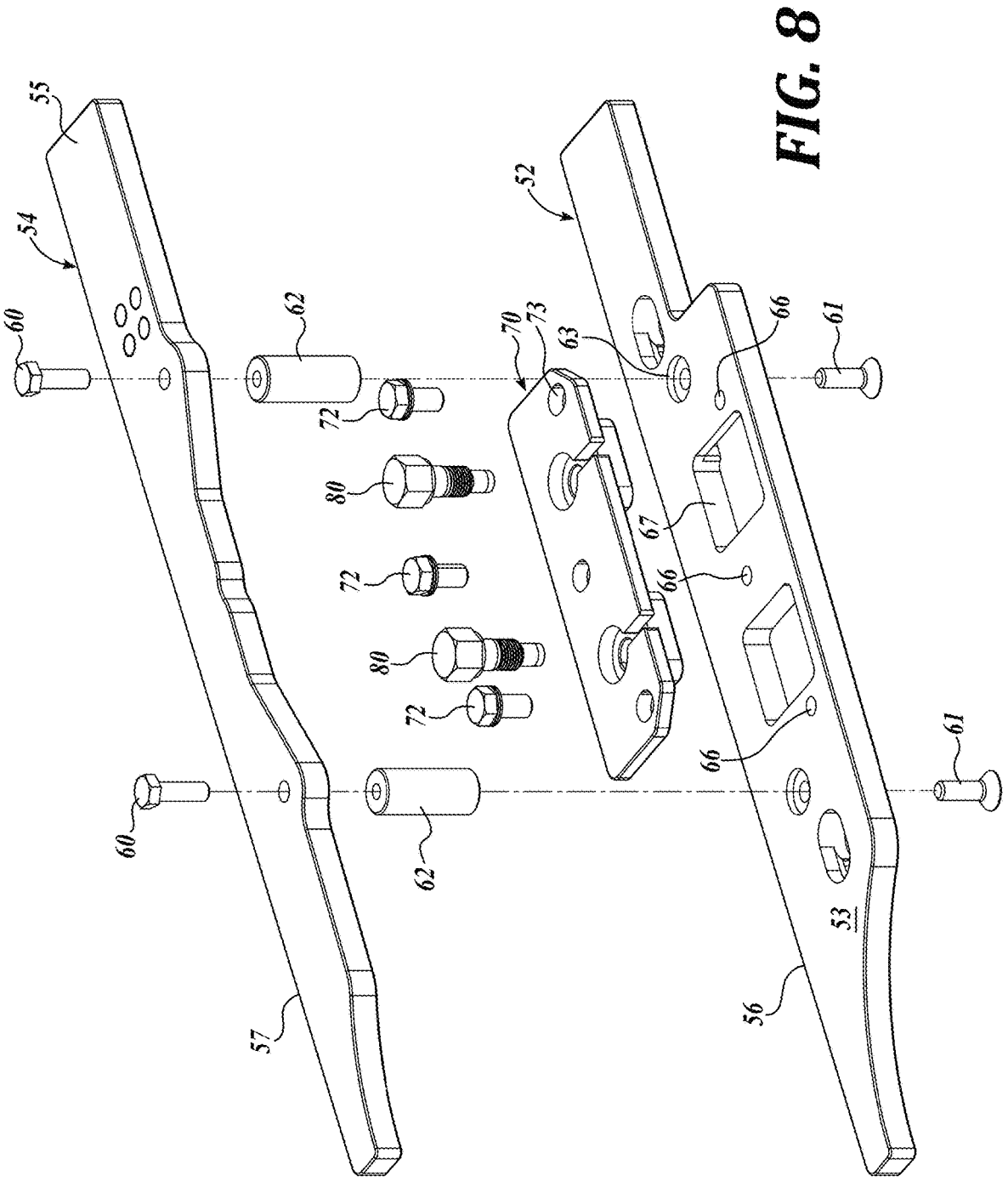
FIG. 8 is an exploded view of the replaceable rail assembly of FIG. 7.

The inner conveyor discharge guide rail assembly (50) is depicted in FIG. 7 and is mountable atop the upper surface (27) of the support plate (26) of the base (24). Guide rail assembly (50) generally includes a bottom rail (52), a top rail (54), and an adjustment member located therebetween. In the embodiment shown, the adjustment member includes adjustment plate (70) adjustably mounted to the upper surface of the bottom rail (52). As further explained herein, the adjustment plate (70) is used to non-adjustably mount the guide rail assembly (50) to the base (24), and the adjustment plate (70) is adjustably attached to the bottom rail (52) (against the upper surface (53) of the bottom rail).

As used herein, non-adjustable attachment or mounting of one component to another means that the two components are self-aligning such that the components attach or mount to one another in a pre-defined, alignment.

The top and bottom rails (54, 52) of the guide rail assembly (50) are also attached to one another in spaced-apart relationship. In the embodiment shown, the top and bottom rails (54, 52) are attached to one another using, for example, threaded fasteners (60, 61) and internally threaded, hollow spacers (62). The spacers are received in counterbores (63) in the upper surface (53) of the bottom rail (52), and in similar counterbores in the bottom surface of the top rail (54) (not shown). Threaded fasteners (60) extend through the upper surface (55) of the top rail (54) and are threadingly received in the upper end of the spacers (62). Threaded fasteners (61) extend through the bottom surface of the bottom rail (52) and are threadingly received in the lower end of the spacers (62). It will be understood, of course, that the top and bottom rails (54, 52) can be secured to one another in a spaced-apart relationship in a variety of alternative ways (e.g., threaded bolts that extend the entire length of the spacers (62) and through the thickness of both top and bottom rails (54, 52)).

The top and bottom rails are secured to one another such that their guide surfaces (56, 57) are aligned with one another (i.e., so that, when mounted to the seaming line, the guide surfaces (56, 57) simultaneously contact each can). The inner conveyor discharge guide rail assembly (50) can be fabricated (e.g., machined from metal, such as stainless steel) with suitable tolerances so that, upon assembly, proper alignment of the guide surfaces (56, 57) is assured. However, seaming lines, including the frames to which guide rail devices are attached, typically are not precisely aligned or degrade over time—especially after continued use. For example, seaming lines experience considerable vibration during use. As a result, portions of the frames can become misaligned such that changing guide rails can be a time-consuming process due to the necessity of aligning the guide rail properly with respect to the conveyor, rotating turrets, and other portions of the sealing line.

Further, many conventional guide rail devices include bases that must be removed with the guide rail(s) for changeovers to new guide rails. As a result, changing guide rails to accommodate a different size can currently requires considerable adjustment of the guide rail(s) with respect to the frame any time a guide rail device is changed. In some embodiments, guide rail devices of the present disclosure use a common base that remains mounted to the frame, with each base plate accommodating at least two different sizes of the associated guide rail assembly. The bases include a support plate having a flat, horizontal (as mounted to the frame) surface on which the guide rail assembly is mounted, with the support plate configured such that the base and guide rail assembly are self-aligning with respect to each other. In addition, locating mounting fasteners are used to attach the guide rail assembly to the base, thereby providing the self-aligning feature—i.e., once the base is properly aligned on the frame, the guide rail assembly can be non-adjustably, and precisely attached to the base such that proper alignment of the guide rails with respect to the seaming line is assured.

As best seen in FIGS. 8-15, adjustment plate (70) is attached to the bottom rail (52) in an adjustable manner. The position of the adjustment plate (70) on the bottom rail (52) can be adjusted to ensure proper alignment of the guide rails (52, 54) when the adjustment plate is used to precisely locate the entire guide rail assembly (50) on the base (24) and attach the guide rail assembly to the base. The guide rail assembly (50) attaches to the base (24) in a single, non-adjustable orientation (i.e., the guide rail assembly (50) and base (24) are self-aligning). In particular, adjustment plate (70) is attached to bottom rail (52) using adjustment fasteners (72) (e.g., threaded bolts) received in receiving apertures (66) (e.g., threaded holes) in the bottom rail (52).

As best seen in FIG. 13, the adjustment fasteners (72) are inserted through enlarged adjustment apertures (73) (e.g., through holes) that extend through the thickness of the adjustment plate (70). The adjustment apertures (73) have a diameter larger than the diameter of the adjustment fasteners (72) (e.g., the diameter of the threaded shaft of a threaded bolt) such that the position of the adjustment plate (70) on the upper surface (53) of the bottom rail (52) can be altered for alignment purposes. This allows for the position of the adjustment plate to be altered so that, when the adjustment plate is mounted to a base on the frame (12) of the sealing line, the guide rails (52, 54) of the guide rail assembly (50) will be properly aligned with respect to the frame and other seaming line components. Once the alignment plate (70) is correctly aligned with respect to the top and bottom rails, no further alignment is typically necessary when the guide rail assembly (50) is mounted to the base attached to the seaming line.

It should also be noted that, in the depicted embodiment, the diameters of the receiving apertures (66) in the bottom rail (52) are not enlarged with respect to the adjustment fasteners (72). Instead, the receiving apertures (66) threadingly receive the adjustment fasteners (72) for securely attaching the adjustment plate (70) to the bottom rail. In an alternative embodiment, the receiving apertures (66) can be enlarged with respect to the adjustment fasteners (72) for adjustably securing the adjustment plate (70) to the bottom rail (52) using, for example, threaded nuts (not shown) positioned against the bottom surface of the bottom rail, aligned with the apertures (66).

Once the guide rail assembly (50) is alignably assembled, mounting fasteners (e.g., bolts) (80) are used to attach the rail assembly to base (24) mounted to the frame (12). Counterbored through holes (82) are provided in adjustment plate (70) and include a counterbore (83) for receiving the enlarged head (84) of a mounting bolt (80). Counterbores (83) serve to reduce the contact area between the mounting bolts (80) and the inner wall of the through holes (82) to reduce the risk of galling during assembly (particularly since the mounting bolts closely fit within the through holes (82)).

Since the locating surface of the guide rail assembly (50) (i.e., the surface of the member through which the mounting bolts tightly pass nearest the base) should be in contact with the base, projections (90) extend downwardly away from the bottom surface (75) (i.e., the locating surface) of the adjustment plate (70). Without such projections, the adjustment plate would, by necessity, have to be located below the bottom rail (52), resulting in the bottom rail to be positioned too high with respect to the base. While two projections (90) are depicted as rectangular in cross-section, it will be understood that other shapes, numbers and configurations of projections (90) may be employed. The projections (90) are configured to be received within correspondingly shaped, but oversized, openings (67) in the bottom rail (52). This also allows the projections (90) to serve as guides during mounting of the adjustment plate (70) to the bottom rail (52).

In the embodiment shown, drainage slots (81) are also provided, intersecting the counterbores (83). These drainage slots (81) allow for liquids to be drained from the counterbores (83) in order to facilitate cleaning and avoid bacterial growth and contamination (particularly when the container sealing line is used for beverages and the like). If desired, the surface of the drainage slots can be sloped slightly so that liquid drains from the surface.

Figures 9, 10:
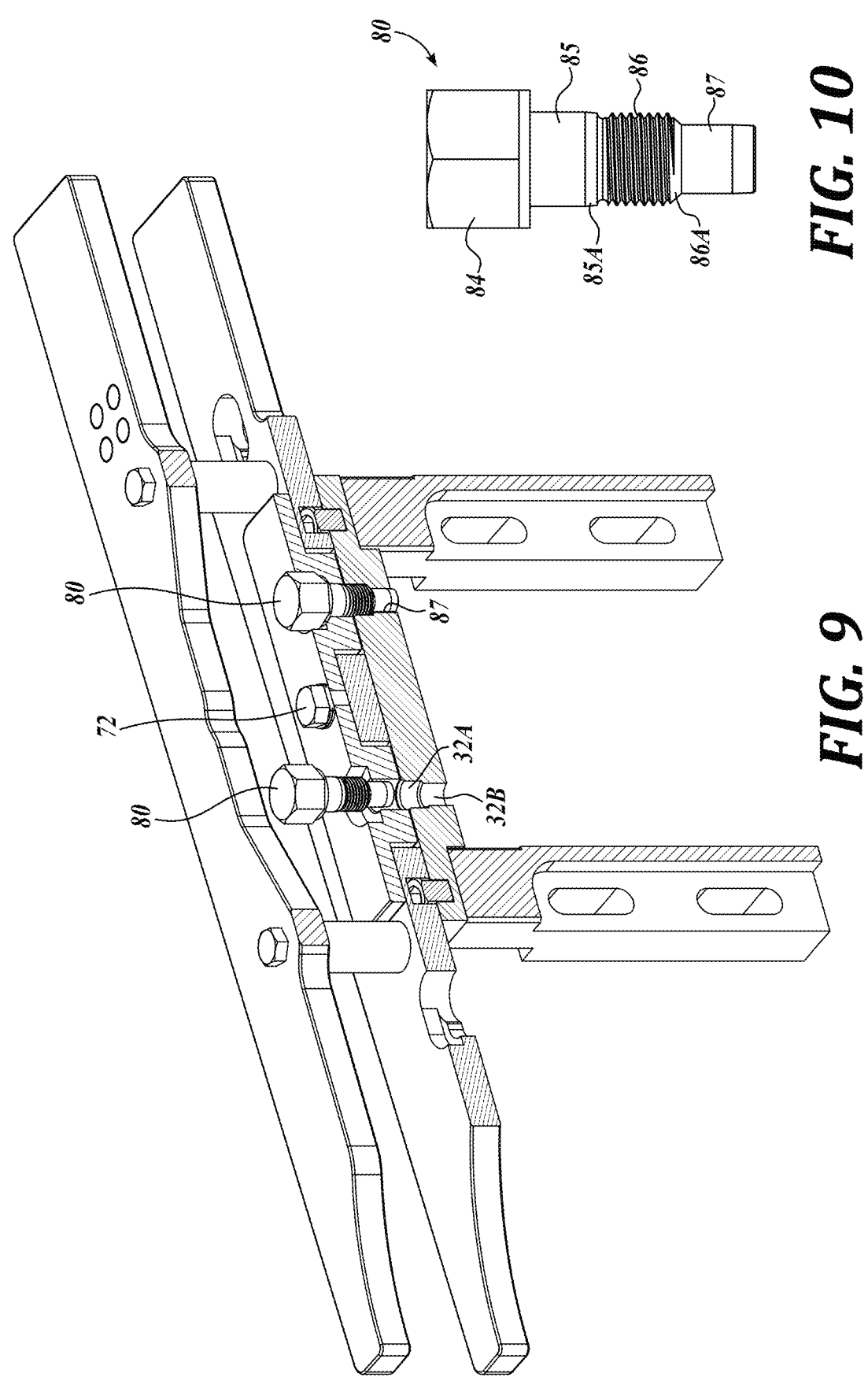
FIG. 9 is a cross-sectional view of the inner conveyor discharge guide rail device of FIG. 2, taken along the line 9-9 thereof, wherein the mounting bolts are not shown in cross-section.
FIG. 10 is a side view of a mounting bolt of the inner conveyor discharge guide rail device of FIG. 9.
Figures 11, 12:
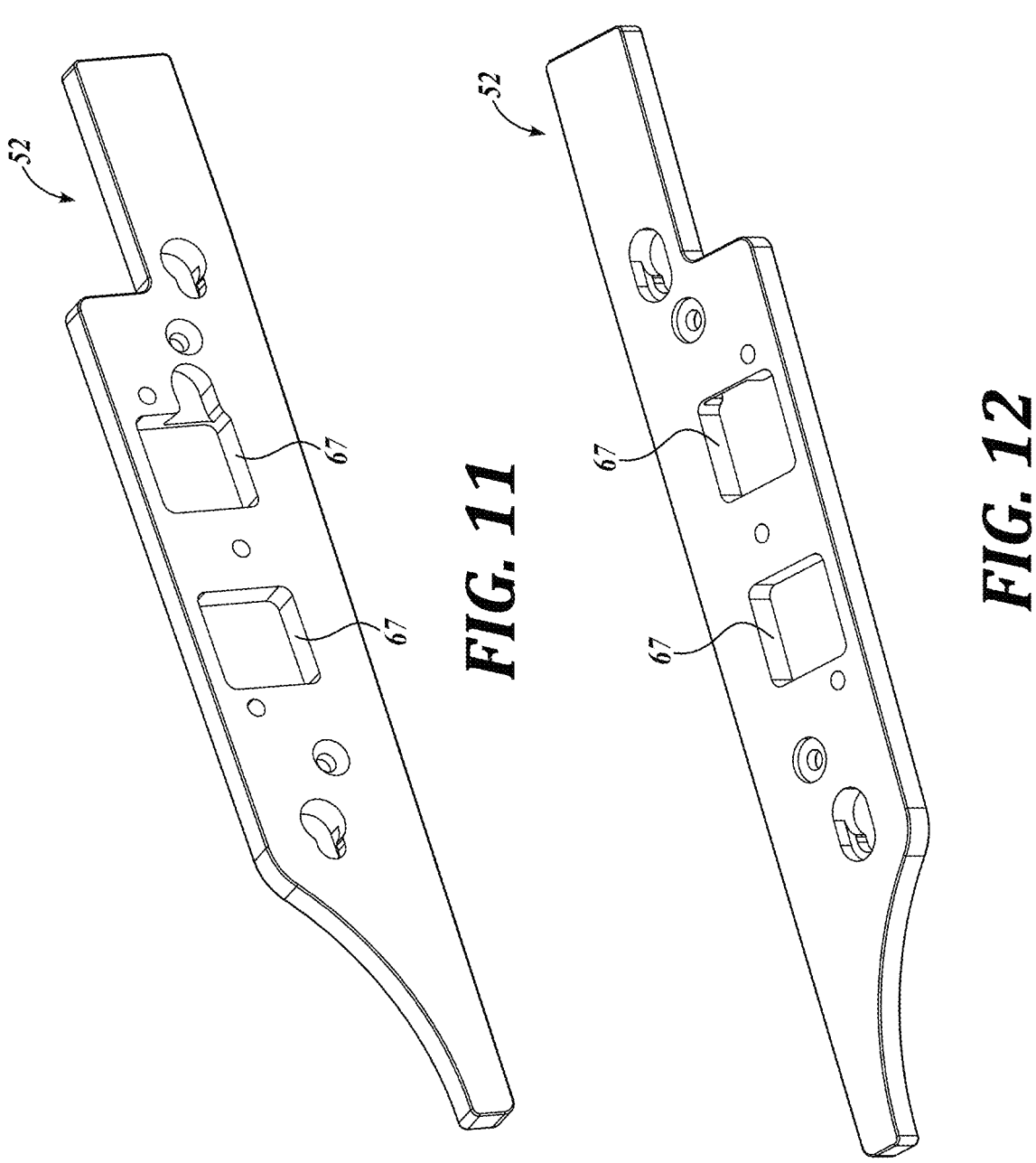
FIG. 11 is an isometric view, from below, of the bottom rail of the rail assembly of FIG. 7.
FIG. 12 is an isometric view, from above, of the bottom rail of the rail assembly of FIG. 7.
Figures 16, 17:
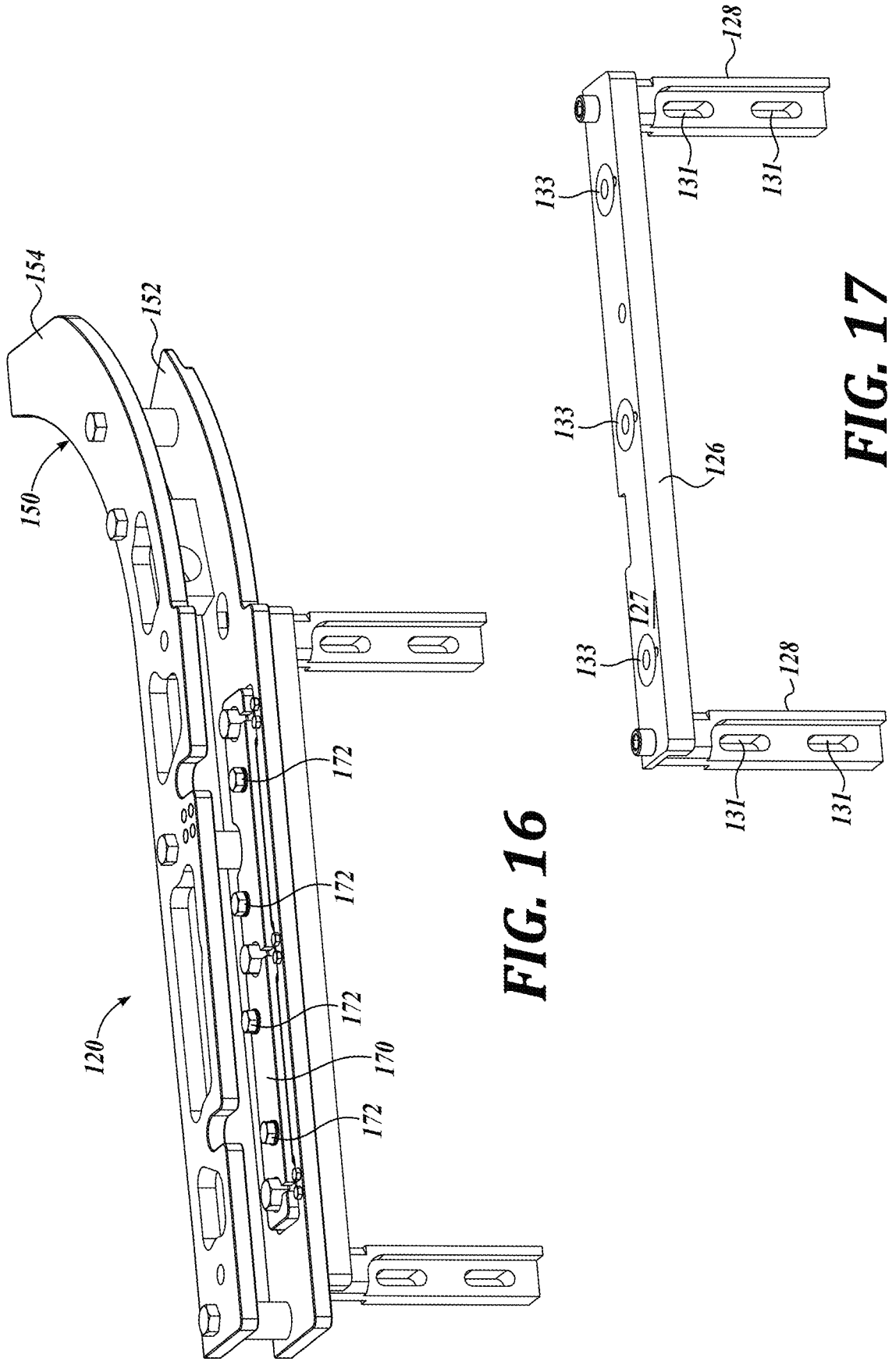
FIG. 16 is an isometric view, from above, of an outer conveyor discharge guide rail device according to one embodiment of the present disclosure.
FIG. 17 is an isometric front view of the base of the outer conveyor discharge guide rail device of FIG. 16.

A double-shouldered mounting bolt (80) is shown in FIG. 10, and includes an enlarged head (84) and a shaft comprising an upper portion (85), a threaded middle portion (86), and a lower portion (87). A first chamfered shoulder (85A) is provided between the upper and middle portions, and a second chamfered shoulder (85B) is provided between the middle and lower portions. The upper and lower portions (85, 87) are shown as lacking threads (i.e., are dowel-shaped), and the upper portion (85) is larger in diameter than the lower portion (87).

Prior to attachment of the guide rail assembly (50) to the base (24), the shaft of each mounting bolt (80) is located in one of the counterbored through holes (82) in the adjustment plate (70), such that the distal (lower) end of the shaft extends below the bottom surface of the bottom rail (52). The guide rail assembly is then mounted onto the support plate (26) of the base (24) such that the shaft of each mounting bolt (80) is inserted into the upper, first portion (32A) of one of the stepped apertures (32) in the support plate (26).

The diameter of the lower portion (87) of the mounting bolt is sized to fit snugly within the lower, second portion (32B) of the stepped aperture such that, as the mounting bolt (80) is further advanced into the stepped aperture (32), the lower portion (87) acts as a pilot, guiding the insertion of the mounting bolt. The mounting bolt is then rotated such that the threaded middle portion (86) threadingly engages the internally threaded first portion (32A) of the stepped aperture until the mounting bolt (80) is fully tightened.

The diameter of the upper portion (85) of the mounting bolt is sized to fit snugly within the counterbore of the through hole (82) in the adjustment plate (70) to further secure the mounting of the adjustment plate (70), and hence the guide rail assembly (50), to the support plate (26) of the base (24). Also, the thickness of the head (84) of the mounting bolt is greater than the depth of the counterbore of the through hole (82) such that the head extends above the top surface (74) of the adjustment plate when the mounting bolt (80) is fully tightened, as shown by the right hand mounting bolt (80) in FIG. 9. This enables the mounting bolts to be tightened using, for example, a wrench. The double-shouldered mounting bolt (80) may correspond to the LOCABOLT™ threaded fastener available from Bev-corp LLC.

For initial alignment of the inner conveyor discharge guide rail device (20) (or other guide rail device described herein), the guide rail assembly (50) is assembled as shown in FIG. 7. The structures for attaching the top and bottom rails are configured to ensure that the guide surfaces (56, 57) are aligned with one another, and the adjustment plate (70) is secured to the bottom rail using adjustment fasteners (72). With the base (24) mounted on the frame, the guide rail assembly (50) is then mounted to the base by inserting the mounting fasteners (80) into the threaded apertures (32) in the base and tightening the mounting fasteners.

The adjustment fasteners (72) are sufficiently loosened to allow the position of the guide rail assembly (i.e., the connected top and bottom rails) to be adjusted with respect to the adjustment plate and the base (which are secured to one another). While using a can plug to check alignment, the position of attached top and bottom guide rails (54, 52) with respect to the adjustment plate (70) is adjusted until the guide surfaces (56, 57) are aligned, within specified tolerances, for guiding and controlling cans.

The adjustment fasteners (72) are then tightened to lock the guide rail assembly (50) in proper alignment. Thereafter, the guide rail assembly (50) can be detached from the base (using mounting bolts (80)). The guide rail assembly (50) can thereafter be remounted to the base without the need to realign the guide surfaces. Or, another, previously aligned guide rail assembly (50) (e.g., for a different can size) can be mounted to the base without the need to realign the guide surfaces of the new guide rail assembly (50).

In summary, inner conveyor discharge guide rail device (20) includes a base (24) mountable to a container sealing line and a guide rail assembly having first and second guide surfaces (56, 57) adapted to guide containers along a portion of the can sealing line. The guide rail assembly includes a first member (e.g., bottom rail (52)), and a second member (e.g., adjustment plate (70)), wherein the first and second members are adjustably attached to one another. A third member (e.g., top rail (54)) attached to the first member is also included, with the guide surfaces (56, 57) on the first and second members (52, 54). The guide rail assembly is securable to the base after the base is mounted to the container sealing line such that the guide rail assembly and base are self-aligning with respect to one another.

Various other guide rail devices of the present disclosure can be configured similar to the inner conveyor discharge guide rail device (20) to provide similar quick change benefits. For instance, as depicted in FIGS. 16-19, outer conveyor discharge guide rail device (120) generally includes a base (124) and an outer conveyor discharge guide rail assembly (150). The base (124) is adapted to be attached to a frame (12) of the sealing line, as best seen in FIG. 1C.

Like the inner conveyor discharge guide rail device (20), the base (124) of the outer conveyor discharge guide rail device (120) includes a support plate (126) and a mounting section for attaching the base to the frame (12). The mounting section includes a pair of mounting rails (128) extending downwardly from opposite ends of the support plate (126). Each of the mounting rails (128) is adapted for attachment to a frame (12) of a seaming line, as seen in FIG. 1C.

As before, each mounting rail includes a pair of elongate apertures (131) for mounting the base (124) to the frame (12), allowing for the base to be vertically adjusted on the frame (12) prior to fixation so that the support plate (126) is positioned at the appropriate height. Once the base (124) is attached to the frame, the outer conveyor discharge guide rail assembly (150) can be affixed to the base (124) without the need to adjust the position of the base (124). Once again, proper alignment of the guide rail assembly (150) with respect to the frame (12) is accomplished by manipulation of the guide rail assembly itself rather than altering the position of the base. This feature allows the guide rail assembly (150) to be quickly changed (e.g., to a guide rail assembly accommodating a different size can).

The support plate (126) can include stepped apertures similar to those described above for receiving mounting bolts (80) used to attach the guide rail assembly (150) to the support plate. In the embodiment shown, however, an alternative mounting arrangement comprising bushings (133) positioned in apertures in the support plate (126) is employed. As explained further in connection with FIGS. 33-37, these bushings (133) are used in conjunction with ball-type fasteners (e.g., a Ball Lock™ mounting system available from Jergens Inc.) to secure the guide rail assembly (150) to the support plate (126). Of course, it will be understood that the arrangement described above for mounting the guide rail assembly (50) to the support plate (26) can be used, including mounting bolts (80).

Figures 18, 18A:
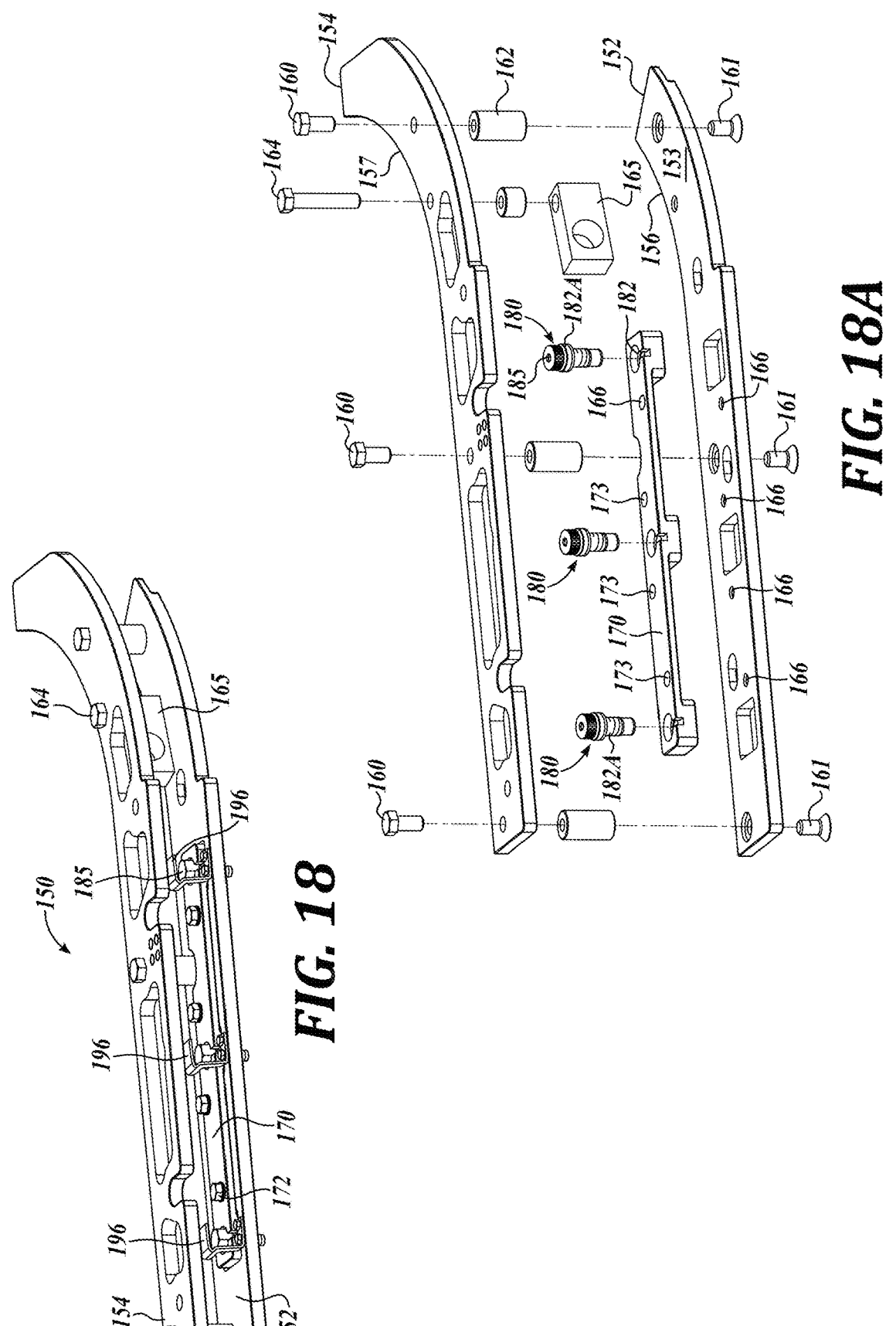
FIG. 18 is an isometric front view of the replaceable rail assembly of the outer conveyor discharge guide rail device of FIG. 2.
FIG. 18A is an exploded view of the replaceable rail assembly of FIG. 18.

The outer conveyor discharge guide rail assembly (150) is depicted in FIGS. 18 and 18A and is mountable atop the upper surface (127) of the support plate (126) of the base (124). Guide rail assembly (150) generally includes a bottom rail (152), a top rail (154), and an adjustment member located therebetween. In the embodiment shown, the adjustment member includes adjustment plate (170) adjustably mounted to the upper surface of the bottom rail (152). As before, the adjustment plate (170) is used to non-adjustably mount the guide rail assembly (150) to the base (124), but the adjustment plate (170) is adjustably attached to the bottom rail (152) (against the upper surface (153) of the bottom rail). The top and bottom rails (154, 152) are also attached to one another in spaced-apart relationship, in the manner previously described.

Outer conveyor discharge guide rail device (120) is mounted to the container sealing line for guiding seamed cans leaving the discharge turret, guiding the cans to further processing and/or packaging (not shown). A lower portion of the cans (C) contacts the guide surface (156) of the bottom rail (152), and an upper portion of the cans (C) contacts the guide surface (157) of the top rail (154). As before, the top and bottom rails are secured to one another such that their guide surfaces (156, 157) are aligned with one another (i.e., so that the guide surfaces (156, 157) both contact each can, when mounted to the seaming line).

In the embodiment shown, the top and bottom rails (154, 152) are attached to one another using, for example, threaded fasteners (160, 161) and internally threaded, hollow spacers (162). The spacers are received in counterbores in the upper surface (153) of the bottom rail (152), and in similar counterbores in the bottom surface of the top rail (154). Threaded fasteners (160) extend through the upper surface (155) of the top rail (154) and are threadingly received in the upper end of the spacers (162). Threaded fasteners (161) extend through the bottom surface of the bottom rail (152) and are threadingly received in the lower end of the spacers (162). The top and bottom rails (154, 152) are thus secured to one another in a spaced-apart relationship. It will be understood, of course, that the top and bottom rails (154, 152) can be secured to one another in a spaced-apart relationship in a variety of alternative ways.

The outer conveyor discharge guide rail device (120) embodiment depicted in FIGS. 16-19 further includes an optional sensor mounting block (165) secured between the top and bottom rails by a fastener (164). Sensor mounting block (165) can be used in instances where a sensor is desired to be mounted to the outer conveyor discharge guide rail device (120). Otherwise, sensor mounting block (165) is omitted.

Adjustment plate (170) is adjustably attached to the bottom rail (152) and is then used to non-adjustably attached the guide rail assembly (150) to the base (124) (i.e., the guide rail assembly (150) attaches to the base (124) in a single, non-adjustable orientation). In particular, adjustment plate (170) is attached to bottom rail (152) using adjustment fasteners (172) (e.g., threaded bolts) received in receiving apertures (166) (e.g., threaded holes) in the bottom rail (152). As before, the adjustment fasteners (172) are inserted through enlarged adjustment apertures (173) (e.g., through holes) that extend through the thickness of the adjustment plate (170). The adjustment apertures (173) have a diameter larger than the diameter of the adjustment fasteners (172) (e.g., the diameter of the shaft of a threaded bolt) such that the position of the adjustment plate (170) on the upper surface (153) of the bottom rail (152) can be altered for alignment purposes.

Once the guide rail assembly (150) is alignably assembled, mounting fasteners similar to mounting bolts (80) can be used to attach the rail assembly to base (150) mounted to the frame (12), in the manner previously described. Alternatively, as explained further herein, ball-type fasteners (180) can be used, in conjunction with bushings (133) to secure the guide rail assembly (150) to the support plate (126).

In the embodiment shown, three mounting fasteners (180) are used to attach the rail assembly to the base. While two or any number of mounting fasteners can be used to attach the rail assembly to the base, in general only two of the mounting fasteners are used to locate the rail assembly on the base (i.e., for self-alignment). As explained further herein, the third (or more) mounting fastener is non-locating in nature, and therefore such non-locating fastener(s) does not fit snugly within the aperture (182) through which the mounting fastener passes.

In the embodiment shown, hold-down brackets (196) are provided, and extend above the fasteners (180). As explained below in connection with the guide rail device of FIGS. 33-36, the hold-down brackets extend over the location of the mounting bolts (180), and allow the mounting bolts to be retained on the guide rail assembly, with the mounting bolts (180) extending through the through holes (182) and with the head (185) of the mounting bolts located above the upper surface of the adjustment plate (170). The length of the mounting bolt (180) is greater than the distance from the upper surface (174) of the adjustment plate to the bottom surface of the hold-down bracket when the guide rail assembly (150) is assembled. Accordingly, the mounting bolts (180) are captive on the guide rail assembly (150). It will be understood, however, that the hold-down brackets may be omitted on the guide rail systems described herein such that the mounting bolts (180) are not captive on the guide rail assembly.

As with the embodiment of the inner conveyor discharge guide rail device (20), projections (190) extend downwardly away from the bottom surface (175) of the adjustment plate (170). While the projections (190) are depicted as rectangular in cross-section, it will be understood that other shapes and configurations may be used. The projections (190) are configured to be received within correspondingly shaped, but oversized, openings (167) in the bottom rail (152). This also allows the projections (190) to serve as guides during mounting of the adjustment plate (170) to the bottom rail (152).

As with the inner conveyor discharge guide rail device (20), the outer conveyor discharge guide rail device (120) is mounted to the base (124) using mounting bolts (180). For initial alignment of the outer conveyor discharge guide rail device (120), the guide rail assembly (150) is assembled as shown in FIG. 18. The structures for attaching the top and bottom rails are configured to ensure that the guide surfaces (156, 157) are aligned with one another, and the adjustment plate (170) is secured to the bottom rail using adjustment fasteners (172).

With the base (124) mounted on the frame, the guide rail assembly (150) is then mounted to the base using the mounting fasteners (180) and tightening the mounting fasteners. The adjustment fasteners (72) are sufficiently loosened to allow the position of the guide rail assembly (i.e., the connected top and bottom rails) to be adjusted with respect to the adjustment plate and the base (which are secured to one another).

While using a can plug to check alignment, the position of attached top and bottom guide rails (154, 152) with respect to the adjustment plate (170) is adjusted until the guide surfaces (156, 157) are aligned for guiding and controlling cans. The adjustment fasteners (172) are then tightened to lock the guide rail assembly (150) in proper alignment. Thereafter, the guide rail assembly (150) can be detached from the base (using mounting bolts (180)). The guide rail assembly (150) can thereafter be remounted to the base without the need to realign the guide surfaces. Or, another, previously aligned guide rail assembly (150) (e.g., for a different can size) can be mounted to the base without the need to realign the guide surfaces of the new guide rail assembly (150).

In summary, outer conveyor discharge guide rail device (120) includes a base (124) mountable to a container sealing line, and a guide rail assembly having first and second guide surfaces (156, 157) adapted to guide containers along a portion of the can sealing line. The guide rail assembly includes a first member (e.g., bottom rail (152)), and a second member (e.g., adjustment plate (170), wherein the first and second members are adjustably attached to one another. A third member (e.g., top rail (154) attached to the first member is also included, with the guide surfaces (156, 157) on the first and second members (152, 154). The guide rail assembly is securable to the base after the base is mounted to the container sealing line such that the guide rail assembly and base are self-aligning with respect to one another.

FIGS. 20-23 depict an outer discharge guide rail device (220) used to control and direct cans leaving the seaming turret to upper discharge guide rail device (420) the discharge turret. Outer discharge guide rail device (220) is mounted to the container sealing line for guiding seamed cans leaving the seaming turret, directing the cans to the discharge turret. Similar to the inner conveyor discharge guide rail device (20) and the outer conveyor discharge guide rail device (120), the outer discharge guide rail device (220) can be quickly and easily changed to accommodate at least two different sizes of cans.

In that regard, outer discharge guide rail device (220) generally includes a base and an outer discharge guide rail assembly (250). The base, comprising a support plate (226), is adapted to be fixedly attached to a frame (12) of the sealing line, as best seen in FIG. 1E. In this instance, the base of the outer discharge guide rail device (220) includes a stepped support plate (226) having a support section (226A) and a mounting section (226B) for attaching the base to the frame (12) using bolts (229) (or other fasteners). Moreover, the mounting section (226B) is attached to an attachment plate (AP; see FIG. 1E) attached to the frame (12) adjacent the discharge turret (DT). Of course, the support plate (226) of the outer discharge guide rail device (220) can be attached to the frame in any of a variety of alternative ways.

Once the base is attached to the frame, the outer discharge guide rail assembly (250) can be affixed to the support plate (226) (i.e., the base) without the need to adjust the position of the support plate (226). Once again, proper alignment of the guide rail assembly (250) with respect to the frame (12) is accomplished by manipulation of the guide rail assembly itself rather than altering the position of the base. This feature allows the guide rail assembly (250) to be quickly changed (e.g., to a guide rail assembly accommodating a different size can), as the support plate (226) remains fixedly attached to the frame (12) during changeover.

The support section (226A) of the support plate (226) includes stepped apertures (232) similar to those described above for receiving mounting bolts (80) used to attach the guide rail assembly (50) to the support plate. In this instance, mounting bolts (280) are identical to mounting bolts (80) described above and may be used in the same manner.

The outer discharge guide rail assembly (250) is depicted in FIG. 22, and is mountable atop the upper surface (227) of the support section (226A) of the support plate (226). Unlike the previously described embodiments, guide rail assembly (250) has a single guide rail (254) that contacts cans along guide surface (257). Thus, guide rail assembly (250) generally includes a bottom member (or plate) (252) (equivalent to bottom rail (52) of the previous embodiment but without a guide surface), rail (254), and an adjustment member located therebetween.

In the embodiment shown, the adjustment member includes adjustment plate (270) adjustably mounted to the upper surface of the bottom plate (252). As previously described, the adjustment plate (270) is used to non-adjustably mount the guide rail assembly (250) to the base, and the adjustment plate (270) is adjustably attached to the bottom plate (252) (against the upper surface of the bottom plate). The rail (254) and the bottom plate (252) are also attached to one another in spaced-apart relationship.

Like the top and bottom rails of the previously described guide rail assemblies, the rail (254) and bottom plate (252) of the outer discharge guide rail assembly (250) are secured relative to one another in a spaced-apart relationship, such as by using spacers (262) secured between the bottom surface of the rail (254) and the upper surface of the bottom plate (252). The spacers are received in counterbores in the upper surface of the bottom plate (252) and in similar counterbores in the bottom surface of the rail (254). Threaded fasteners (260) extend through the upper surface (255) of the guide rail (254) and are threadingly received in the upper end of the spacers (262). Threaded fasteners (261) extend through the bottom surface of the bottom plate (252) and are threadingly received in the lower end of the spacers (262). The guide rail and adjustment plate (254, 270) are thus secured to one another in a spaced-apart relationship.

Adjustment plate (270) is adjustably attached to the bottom plate (252) and is then used to non-adjustably attach the guide rail assembly (250) to the base (i.e., the guide rail assembly (250) attaches to the support plate (226) in a single, non-adjustable orientation). In particular, adjustment plate (270) is attached to bottom plate (252) using adjustment fasteners (272) (e.g., threaded bolts) received in receiving apertures (266) (e.g., threaded holes) in the bottom plate (252). As before, the adjustment fasteners (272) are inserted through enlarged adjustment apertures (273) (e.g., through holes) that extend through the thickness of the adjustment plate (270). The adjustment apertures (273) have a diameter larger than the diameter of the adjustment fasteners (272) (e.g., the diameter of the shaft of a threaded bolt) such that the position of the adjustment plate (270) on the upper surface (253) of the lower plate (252) can be altered for alignment purposes.

Once the guide rail assembly (250) is alignably assembled, mounting fasteners (280) similar to mounting bolts (80) can be used to attach the rail assembly to the support plate (226) mounted to the frame (12), such as in the manner previously described. For initial alignment of the outer discharge guide rail device (220), the guide rail assembly (250) is assembled as shown in FIG. 22. With the base (224) mounted on the frame, the guide rail assembly (250) is then mounted to the base using the mounting fasteners (280) and tightening the mounting fasteners. The adjustment fasteners (272) are sufficiently loosened to allow the position of the guide rail assembly (i.e., the connected top and bottom rails) to be adjusted with respect to the adjustment plate and the base (which are secured to one another).

While using a can plug to check alignment, the position of guide rails (254) with respect to the adjustment plate (270) is adjusted until the guide surfaces (257) is aligned for guiding and controlling cans. The adjustment fasteners (272) are then tightened to lock the guide rail assembly (250) in proper alignment. Thereafter, the guide rail assembly (250) can be detached from the base (using mounting bolts (280)). The guide rail assembly (250) can thereafter be remounted to the base without the need to realign the guide surfaces. Or, another, previously aligned guide rail assembly (250) (e.g., for a different can size) can be mounted to the base without the need to realign the guide surfaces of the new guide rail assembly (250).

In summary, outer discharge guide rail device (220) includes a base (224) mountable to a container sealing line, and a guide rail assembly having a guide surface (257) adapted to guide containers along a portion of the can sealing line. The guide rail assembly includes a first member (e.g., bottom plate (252)), and a second member (e.g., adjustment plate (270), wherein the first and second members are adjustably attached to one another. A third member (e.g., guide rail (254)) attached to the first member is also included, with the guide surface (257) provided on the third member. The guide rail assembly is securable to the base after the base is mounted to the container sealing line such that the guide rail assembly and base are self-aligning with respect to one another.

FIGS. 24-28 depict can feed/discharge guide rail device (320) that can be mounted to the container sealing line for controlling and guiding filled cans into the feed turret (FT) (see FIG. 1C). Similar to the inner conveyor discharge guide rail device (20), the outer conveyor discharge guide rail device (120), and the outer discharge guide rail device (220), the can feed/discharge guide rail device (320) can be quickly and easily adapted to accommodate at least two different sizes of cans.

Can feed/discharge guide rail device (320) is similar in construction to inner conveyor discharge guide rail device (20) of FIGS. 2-16, with the primary distinctions being the shape of the top and bottom rails (354, 352) and that the base includes a planar support plate (326). The base, comprising support plate (326), is adapted to be fixedly attached to a frame (12) of the sealing line, as best seen in FIG. 1C. The support plate (326) is adapted to be mounted to the frame (12) using, for example, bolts (329) (or other fasteners). Of course, the support plate (326) of the can feed/discharge guide rail device (320) can be attached to the frame in any of a variety of alternative ways and can be alternatively configured similar to the bases described previously herein.

Once the base is attached to the frame, the can feed/discharge guide rail assembly (350) can be affixed to the support plate (326) (i.e., the base) without the need to adjust the position of the support plate (326). Once again, proper alignment of the guide rail assembly (350) with respect to the frame (12) is accomplished by manipulation of the guide rail assembly itself rather than altering the position of the base or the attachment of the guide rail assembly and the base (i.e., the guide rail assembly (350) and the support plate (326) are self-aligning). This feature allows the guide rail assembly (350) to be quickly changed (e.g., to a guide rail assembly accommodating a different size can), as the support plate (326) remains fixedly attached to the frame (12) during changeover.

The support plate (326) can include stepped apertures similar to those described above for receiving mounting bolts used to attach the guide rail assembly (50) to the support plate. In the embodiment shown, however, the alternative mounting arrangement comprising bushings (333) positioned in apertures in the support plate (326) is used. As explained further herein, these bushings (333) are used in conjunction with ball-type fasteners to secure the guide rail assembly (350) to the support plate (326).

The can feed/discharge guide rail assembly (350), which is depicted in FIG. 26, is mountable atop the upper surface of the support plate (326). Can feed/discharge guide rail assembly (350) once again has spaced apart top and bottom rails (354, 352) that contact cans along their guide surfaces (357, 356, 358B). Guide surfaces (357, 356) are configured for controlling and guiding filled cans into the feed turret (FT). Guide surface (358B), on the other hand, is configured for controlling and guiding sealed cans from the feed turret (FT) into the discharge turret.

The outer surface of the bottom rail (352) includes a pair an arcuate section (358A) arranged to accommodate the seaming turret (ST) when the can feed/discharge guide rail assembly (350) is mounted to a seaming line. The top and bottom rails (354, 352) are secured to one another in a spaced-apart orientation using, for example, threaded bolts and spacers, as described previously. Once again, an adjustment member in the form of adjustment plate (370) may be adjustably mounted to the upper surface of the bottom rail (352). As previously described, the adjustment plate (370) is used to non-adjustably mount the guide rail assembly (350) to the base, and the adjustment plate (370) is adjustably attached to the bottom rail (352) (against the upper surface (353) of the bottom rail).

Adjustment plate (370) is adjustably attached to the bottom rail (352) and is then used to non-adjustably attached the guide rail assembly (350) to the base (i.e., the guide rail assembly (350) attaches to the support plate (326) in a single, non-adjustable orientation). In particular, adjustment plate (370) is attached to bottom rail (352) using adjustment fasteners (372) (e.g., threaded bolts) received in receiving apertures (366) (e.g., threaded holes) in the bottom rail (352).

As before, the adjustment fasteners (372) are inserted through enlarged adjustment apertures (373) (e.g., through holes) that extend through the thickness of the adjustment plate (370). The adjustment apertures (373) have a diameter larger than the diameter of the adjustment fasteners (372) (e.g., the diameter of the shaft of a threaded bolt) such that the position of the adjustment plate (370) on the upper surface (353) of the bottom rail (352) can be altered for alignment purposes. As with the embodiment of the inner conveyor discharge guide rail device (20), projections (390) extend downwardly away from the bottom surface (375) of the adjustment plate (370), and are configured to be received within correspondingly shaped, but oversized, openings (367) in the bottom rail (352).

Once the guide rail assembly (350) is alignably assembled, mounting fasteners similar to mounting bolts (80) can be used to attach the rail assembly to base (350) mounted to the frame (12), in the manner previously described. Counterbored through holes (282) are provided in adjustment plate (270), which can be configured in the same manner as through holes (82). Projections (290) extend downwardly away from the bottom surface (i.e., the locating surface) of the adjustment plate (270), and are configured to be received within correspondingly shaped, but oversized, openings (267) in the bottom plate (252).

Once the guide rail assembly (350) is alignably assembled, mounting fasteners (380) similar to mounting bolts (80) can be used to attach the rail assembly to the support plate (326) mounted to the frame (12), in the same manner as previously described for the other guide rail devices.

In summary, can feed/discharge guide rail device (320) includes a base (e.g., 326) mountable to a container sealing line, and a guide rail assembly having first, second and third guide surfaces (356, 357, 358B) adapted to guide containers along a portion of the can sealing line. The guide rail assembly includes a first member (e.g., bottom rail (352)), and a second member (e.g., adjustment plate (370)), wherein the first and second members are adjustably attached to one another. A third member (e.g., top rail (354)) attached to the first member is also included, with the guide surfaces (356, 357, 358B) on the first and second members (352, 370). The guide rail assembly is securable to the base after the base is mounted to the container sealing line such that the guide rail assembly and base are self-aligning with respect to one another.

FIGS. 29-32 depict upper discharge guide rail device (420) which can be positioned immediately downstream of the outer discharge guide (220), adjacent the discharge turret (DT) (see FIGS. 1C and 1E), for controlling and guiding seamed cans from the feed turret (FT) into the discharge turret (see FIG. 1E). Similar to the inner conveyor discharge guide rail device (20), the outer conveyor discharge guide rail device (120), the outer discharge guide rail device (220), and the can feed/discharge guide rail device (320), the upper discharge guide rail device (420) can be quickly and easily adjusted to accommodate at least two different sizes of cans (by replacing the guide rail assembly (450)).

Upper discharge guide rail device (420) includes a base comprising a stepped support plate (426) adapted to be mounted to the can seamer (not shown) in the orientation shown in FIG. 1E. Unlike the previously described embodiments, upper discharge guide rail device (420) is mounted to the seamer with the base located above the single guide rail (470).

While support plate (426) can be mounted to the seamer or frame in a variety of ways, in the depicted embodiment the support plate includes a compression mount (428) comprising a cantilevered portion (428A) separated from the remainder of the compression mount (428) by a slot (428B) that extends from an outer end of the compression member to an aperture (431) extending orthogonally through the support plate (426). A threaded bolt (429) is secured within a threaded aperture (429A) that extends across and through the compression mount (428), spanning the slot (428B). To mount the support plate (426) to the seamer, a mounting pin (not shown) is received in the aperture (431) of the compression mount (428). The bolt (429) is then threadably driven into the aperture (429A) such that the slot (428B) is narrowed and the compression mount is securely clamped to the mounting pin of the seamer.

The upper discharge guide rail device (420) includes an upper discharge guide rail assembly (450) mountable to the support plate (426). As before, the guide rail assembly (450) includes an adjustment member adjustably secured to an intermediate member, wherein the adjustment member can be secured to the support plate (426) with an intermediate member located between the adjustment member and the support plate. In this instance, however, the adjustment member includes a guide rail (470), and the intermediate member includes an intermediate plate (or center plate) (452). When the upper discharge guide rail device (420) is assembled (FIG. 29), the intermediate plate (452) is located between the support plate (426) and the guide rail (470) so as to space apart the support plate and guide rail (i.e., the upper discharge guide rail device (420) includes only three plates).

The guide rail (470) includes a guide surface (457) for controlling and guiding seamed cans from the feed turret (FT) into the discharge turret. Once the base is attached to the seamer, the upper discharge guide rail assembly (450) can be affixed to the support plate (426) (i.e., the base) without the need to adjust the position of the support plate (426). Once again, proper alignment of the guide rail assembly (450) with respect to the frame (12) and seamer may be accomplished by manipulation of the guide rail assembly itself rather than altering the position of the base. This feature allows the guide rail assembly (450) to be quickly changed (e.g., to a guide rail assembly accommodating a different size can), as the support plate (426) remains fixedly attached to the seamer during changeover.

The support plate (426) can include stepped apertures similar to those described above for receiving mounting bolts used to attach the guide rail assembly (50) to the support plate. In the embodiment shown, however, the alternative mounting arrangement comprising bushings (433) positioned in apertures in the support plate (426) is used, along with ball-type fasteners (480) to secure the guide rail assembly (450) to the support plate (426).

The upper discharge guide rail assembly (450), which is depicted in FIGS. 32A-32B, is mountable to the bottom surface (427) of the support plate (426). The guide rail (470) (i.e., the adjustment member) is adjustably secured to the intermediate plate (452) and is then used to non-adjustably attach the guide rail assembly (450) to the base (i.e., the guide rail assembly (450) attaches to the support plate (426) in a single, non-adjustable orientation).

In particular, guide rail (470) is attached to intermediate plate (452) using adjustment fasteners (472) (e.g., threaded bolts) received in receiving apertures (466) (e.g., threaded holes) in the intermediate plate (452). As before, the adjustment fasteners (472) are inserted through enlarged adjustment apertures (473) (e.g., through holes) that extend through the thickness of the guide rail (470). The adjustment apertures (473) have a diameter larger than the diameter of the adjustment fasteners (472) (e.g., the diameter of the shaft of a threaded bolt) such that the position of the guide rail (470) on the upper surface (453) of the intermediate plate (452) can be altered for alignment purposes.

Once the guide rail assembly (450) is alignably assembled, mounting fasteners similar to mounting bolts (80) can be used to attach the rail assembly to support plate (426) mounted to the seamer, in the manner previously described. Alternatively, ball-type fasteners (480) can be used, in conjunction with bushings (433) to secure the guide rail assembly (450) to the support plate (426).

In summary, upper discharge guide rail device (420) includes a base (e.g., 426) mountable to a container sealing line, and a guide rail assembly having a first guide surface (457) adapted to guide containers along a portion of the can sealing line. The guide rail assembly includes a first member (e.g., guide rail (470)), and a second member (e.g., intermediate plate (452)), wherein the first and second members are adjustably attached to one another. The guide rail assembly is securable to the base after the base is mounted to the container sealing line such that the guide rail assembly and base are self-aligning with respect to one another.

FIGS. 33-37 depict inlet guide rail device (520) that can be mounted to the frame (12) of a seaming line in opposition can feed/discharge guide rail device (320), for receiving and guiding cans therebetween and directing cans into the feed turret (FT) (see FIG. 1C). Similar to the inner conveyor discharge guide rail device (20), the outer conveyor discharge guide rail device (120), the outer discharge guide rail device (220), the can feed discharge guide rail device (320), and the upper discharge guide rail device (420), the inlet guide rail device (520) can be quickly and easily adjusted to accommodate at least two different sizes of cans (by replacing the guide rail assembly (550)).

Inlet guide rail device (520) is similar to upper discharge guide rail device (420) and includes a base (524) comprising a support plate (526) adapted to be mounted to the frame (12) (similar to the manner in which support plate (26) is mounted to the frame) in the orientation shown in FIG. 1C. The inlet guide rail device (520) also includes an inlet guide rail assembly (550) mountable to the support plate (526).

As before, the guide rail assembly (550) includes an adjustment member adjustably secured to an intermediate member, wherein the adjustment member can be secured to the support plate (526) such that the intermediate member located between the adjustment member and the support plate. In this instance, the adjustment member includes a guide rail (570), and the intermediate member includes an intermediate plate (or center plate) (552). When the inlet guide rail device (520) is assembled (FIGS. 33-34), the intermediate plate (552) is located between the support plate (526) and the guide rail (570) to space apart the support plate and guide rail (i.e., the inlet guide rail device (520) includes only three plates).

The guide rail (570) includes a guide surface (557) for controlling and guiding filled cans into the feed turret (FT). Once the base is attached to the frame, the upper inlet guide rail assembly (550) can be affixed to the support plate (526) (i.e., the base) without the need to adjust the position of the support plate (526). Once again, proper alignment of the guide rail assembly (550) with respect to the frame (12) and seamer may be accomplished by manipulation of the guide rail assembly itself rather than altering the position of the base. This feature allows the guide rail assembly (550) to be quickly changed (e.g., to a guide rail assembly accommodating a different size can), as the support plate (526) remains fixedly attached to the frame during changeover.

The support plate (526) can include stepped apertures similar to those described above for receiving mounting bolts used to attach the guide rail assembly (50) to the support plate. In the embodiment shown, however, the alternative mounting arrangement comprising bushings (533) positioned in apertures in the support plate (526) is used, along with ball-type fasteners (580) to secure the guide rail assembly (550) to the support plate (526), as described below.

The inlet guide rail assembly (550), which is depicted in FIGS. 36-36A, is mountable to the upper surface (527) of the support plate (526). The guide rail (570) (i.e., the adjustment member) is adjustably secured to the intermediate plate (552), and the intermediate plate is then used to non-adjustably attach the guide rail assembly (550) to the base (i.e., the guide rail assembly (550) attaches to the support plate (526) in a single, non-adjustable orientation). In particular, guide rail (570) is attached to intermediate plate (552) using adjustment fasteners (572) (e.g., threaded bolts) received in receiving apertures (566) (e.g., threaded holes) in the intermediate plate (552).

As before, the adjustment fasteners (572) are inserted through enlarged adjustment apertures (573) (e.g., through holes) that extend through the thickness of the guide rail (570). The adjustment apertures (573) have a diameter larger than the diameter of the adjustment fasteners (572) such that the position of the guide rail (570) on the upper surface (553) of the intermediate plate (552) can be altered for alignment purposes.

Once the guide rail assembly (550) is alignably assembled, mounting fasteners similar to mounting bolts (80) can be used to attach the rail assembly to support plate (526) mounted to the seamer, such as in the manner previously described. Alternatively, ball-type fasteners (580) are used in the embodiment shown, in conjunction with bushings (533) to secure the guide rail assembly (550) to the support plate (426). Also, in this instance, unlike the previously described embodiments, the fasteners (580) only extend through the intermediate plate (552) into the bushings (533) mounted in apertures in the support plate (526), rather than extending through both the adjustment member (i.e., guide rail 570) and the intermediate plate (552).

As best seen in FIG. 35 and the cross-sectional view of FIGS. 37 and 37A, the bushings (533) are secured within apertures (532) in the support plate (526), using threaded fasteners (e.g., screws) (591). Each bushing (533) includes an aperture (533A) extending therethrough and having an enlarged ball cavity (533B) in its lower end. The shaft (593A) of a ball-type clamp member (593) is inserted through apertures (582) in the intermediate plate (552) into the interior of the bushing (533), as seen in FIG. 37.

Since the ball-type fasteners (580) are used to precisely locate the guide rail assembly (550) on the support plate (526) (i.e., to self-align guide rail assembly and support plate with respect to each other) a liner bushing (582A) is secured within each aperture (582). Each liner bushing (582A) has a central passageway (582B) for receiving the shaft (593A) of the ball-type fastener (580) and having an inner diameter that closes matches the outer diameter of the shaft (593A) to ensure a snug (aligned) fit of the shaft (593A) in the central passageway (582B).

A plurality of balls (594) are housed in the clamp member (593), adjacent the lower end thereof, adjacent apertures in the wall of the clamp member. A threaded shaft (595) extends into the interior of the clamp member, directly above the balls (594). Once the guide rail assembly (550) is positioned on the support plate (526) in the appropriate location with the clamp members (593) extending into the bushings (533), the threaded shafts (595) are driven into the interior of the clamp members so as to urge the balls (594) downward such that the balls protrude out of the apertures in the wall of the clamp member against the interior wall of the ball cavities (533B), thereby securing the guide rail assembly (550) to the support plate (526).

It should be noted that, in the case of outer conveyor discharge device (120) (FIGS. 16-19) and other guide rail devices where it is desirable to use more than two mounting fasteners (180) to attach the rail assembly to the base, only two of the mounting fasteners are used to locate the rail assembly on the base (i.e., for self-alignment). The third (or more) mounting fastener is non-locating in nature, and therefore such non-locating fastener(s) does not fit snugly within the aperture (182) through which the mounting fastener passes.

Figure 19:
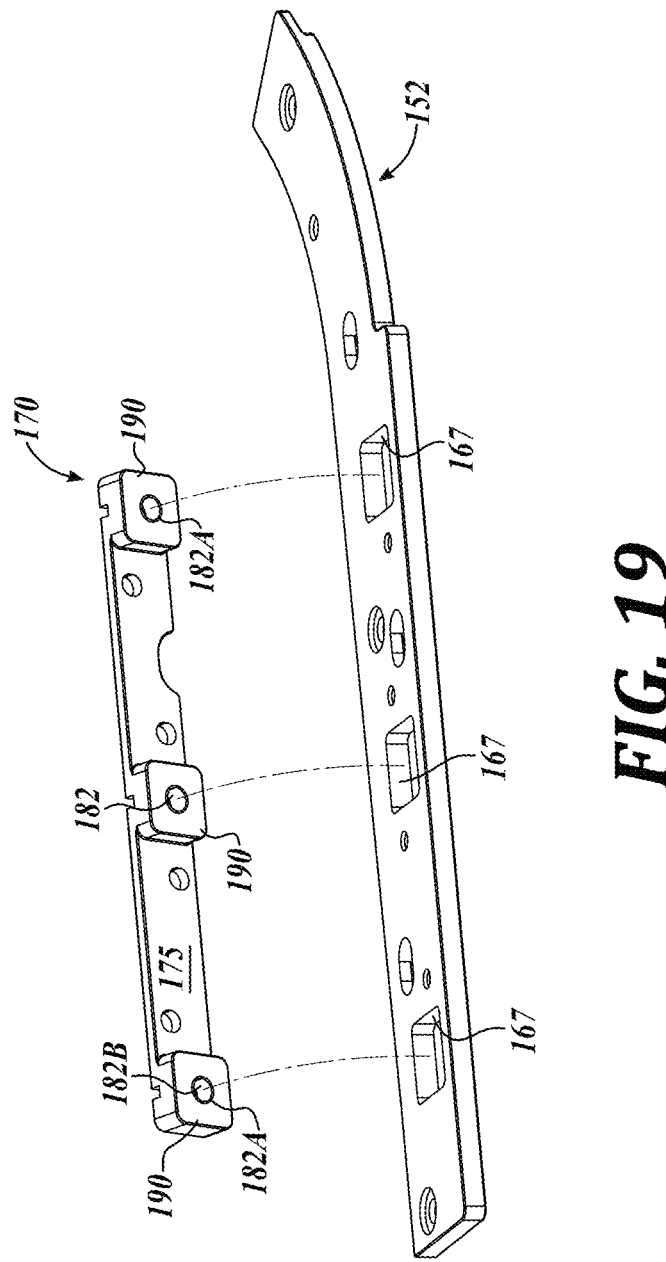
FIG. 19 depicts the adjustment plate and bottom rail of the outer conveyor discharge guide rail device of FIG. 16.

In the case of outer conveyor discharge device (120), as seen in FIG. 19, the center aperture (182) does not include a liner bushing (182A). Further, the diameter of the center aperture (182) in FIG. 19 is slightly larger than the inner diameter (182B) of the bushing (182A), such that the shaft of the mounting bolt (180) will have some play within the center aperture (182). If double-shouldered mounting bolts (80, 280) are used instead of ball-type fasteners in a guide rail device according to the present disclosure utilizing more than one mounting fastener to attach the guide rail assembly to the base, the inner diameter of two of the through holes for the mounting bolts (e.g., counterbored through) should be sized to snugly receive the mounting bolts therein (e.g., the upper portion (85) of the double-shouldered mounting bolt (80)), while the third (or more) through holes are slightly larger so as to provide some movement of the mounting bolt within the through holes.

As best seen in FIGS. 34 and 36, optional hold-down brackets (596) are also provided, and extend above the fasteners (580). The hold-down brackets extend over the mounting bolts (580) and allow the mounting bolts to be retained on the guide rail assembly, with the mounting bolts (580) extending through the apertures (582) with the head (585) of the mounting bolts located above the upper surface (553) of the intermediate plate (552). The length of the mounting bolt (580) is greater than the distance from the upper surface (553) of the intermediate plate (552) to the bottom surface (597) of the hold-down bracket (596) when the guide rail assembly (550) is assembled. The bottom surface (597) of the hold-down bracket (596) prevents the mounting bolt (580) from being removed from the assembled guide rail assembly (550).

In addition, in some embodiments, the hold-down brackets can be configured such that a magnetic force will retain the mounting bolts (580) against the bottom surface (597) of the hold-down brackets (596). By way of example, a planar magnet can be provided on bottom surface (597) for providing a magnetic force that urges the upper end of the head (585) of the mounting bolt (580) against the bottom surface (597) of the hold-down bracket. Such magnetic retention helps to retain the mounting bolts on the guide rail assembly and facilitates attachment of the guide rail assembly (550) to the support plate (526).

Once the guide rail assembly (550) is alignably assembled, mounting fasteners (580) similar to mounting bolts (80) can be used to attach the rail assembly to the support plate (426) mounted to the frame (12), in the same manner as previously described for the other guide rail devices.

To replace the guide rail assembly (550) with one accommodating a different can size, a guide rail assembly (550) attached to the base (e.g., 426) is removed by removing the mounting bolts (580). The new guide rail assembly (550) is then mounted to the base using the mounting bolts (580), without the need to realign the guide surface (457).

In summary, inlet guide rail device (520) includes a base (524) mountable to a container sealing line, and a guide rail assembly having a first guide surface (557) adapted to guide containers along a portion of the can sealing line. The guide rail assembly includes a first member (e.g., intermediate plate (552)), and a second member (e.g., guide rail (570), wherein the first and second members are adjustably attached to one another. The guide surface (557) is provided on the guide rail (570). The guide rail assembly is securable to the base after the base is mounted to the container sealing line such that the guide rail assembly and base are self-aligning with respect to one another.

FIGS. 38-41 depict the right filler guide rail device (620), also known as a sweep rail. Right filler guide rail device (620) is adapted for guiding cans as the cans move along a chain conveyor (CV) located between the right and left filler guide rail devices. Similar to the inner conveyor discharge guide rail device (20), the outer conveyor discharge guide rail device (120), the outer discharge guide rail device (220), the can feed discharge guide rail device (320), the upper discharge guide rail device (420), and the inlet guide rail device (520), the right filler guide rail device (620) can be quickly and easily adjusted to accommodate at least two different sizes of cans (by replacing the guide rail assembly (650)).

Right filler guide rail device (620) includes a guide rail assembly (650) having an elongate guide rail (652) having a guide surface (656) comprising one side edge of the guide rail. A rigidifying bracket (662) is mounted to the upper surface of the guide rail for increasing the rigidity and strength of the guide rail (652).

The right filler guide rail device (620) further includes a base (624) in the form of a mounting bracket that is adapted to be fixedly attached to a frame (12) of the sealing line, as best seen in FIG. 1D. The base (624) includes a support plate (626) and a mounting arm (628) extending downwardly from one edge of the support plate (626). In the embodiment shown, the mounting arm includes a pair of apertures (631) for mounting the base (624) to the frame (12). The apertures are adapted to receive threaded fasteners for mounting the base (624) to the frame (12), as seen in FIG. 1D. The base (624) further includes an alignment pin (634) extending upwardly away from the upper surface of the support plate (626). As described below, the alignment pin (634) is received within a first pin aperture (682) in a first adjustment member (670) when the guide rail assembly (650) is mounted to the frame, and is used to ensure proper alignment of the guide rail assembly on the frame. A second alignment pin (635) is mounted to frame (12), upstream of the base (624). with its location indicated in FIG. 1D. The second alignment pin (635) extends upwardly from the frame (12) and is s received within a second pin aperture (683) in a second adjustment member (676) when the guide rail assembly (650) is mounted to the frame, and is used to further ensure proper alignment of the guide rail assembly on the frame.

Once the base (624) is attached to the frame, the right filler guide rail assembly (650) can be mounted atop the base (624) and to the frame (12), without the need to adjust the guide rail assembly (650) or the position of the base (624). Proper alignment of the guide rail assembly (650) with respect to the frame (12) is accomplished by manipulation of the guide rail assembly itself to that the alignment pins (634, 635) are received within the pin apertures (682, 683) rather than altering the position of the base (624). This feature allows the guide rail assembly (650) to be quickly changed (e.g., to a guide rail assembly accommodating a different size can), as the base (624) remains fixedly attached to the frame (12) during changeover, and the base and guide rail assembly are self-aligning with respect to each other.

As best seen in the bottom views of FIGS. 41-41B, the first adjustment member (or plate) (670) is adjustably attached to the bottom surface of the guide rail (652) using adjustment fasteners (672) (e.g., threaded bolts) received in receiving apertures (666) (e.g., threaded holes) in the adjustment member (670). As best seen in FIG. 41A, the adjustment fasteners (672) are inserted through enlarged adjustment apertures (673) (e.g., through holes) that extend through the thickness of the guide rail (652). The adjustment apertures (673) have a diameter larger than the diameter of the adjustment fasteners (672) (e.g., the diameter of the threaded shaft of a threaded bolt) such that the position of the adjustment plate (670) on the bottom surface of the guide rail (652) can be altered for alignment purposes. This allows for the position of the adjustment plate (670) to be altered so that, when the first alignment pin (634) on the base is received in the first pin aperture (682) during mounting of the guide rail assembly on the base (624), the guide rail (652) of the guide rail assembly (650) will be properly aligned with respect to the frame. Once the alignment plate (70) is correctly aligned with respect to the guide rail (652), no further alignment is typically necessary when the guide rail assembly (650) is mounted to the base attached to the seaming line.

Similarly, the second adjustment member (or plate) (676) is adjustably attached to the bottom surface of the guide rail (652) using adjustment fasteners (672) (e.g., threaded bolts) received in receiving apertures (666) (e.g., threaded holes) in the second adjustment member (676). The adjustment fasteners (672) are inserted through enlarged adjustment apertures (673) (e.g., through holes) that extend through the thickness of the guide rail (652). The adjustment apertures (673) have a diameter larger than the diameter of the adjustment fasteners (672) (e.g., the diameter of the threaded shaft of a threaded bolt) such that the position of the adjustment plate (676) on the bottom surface of the guide rail (652) can be altered for alignment purposes. This allows for the position of the adjustment plate (676) to be altered so that, when the second alignment pin (635) mounted on the frame is received in the second pin aperture (683) during mounting of the guide rail assembly to the frame (12), the guide rail (652) of the guide rail assembly (650) will be properly aligned with respect to the frame. Once the second alignment plate (676) is correctly aligned with respect to the guide rail (652), no further alignment is typically necessary when the guide rail assembly (650) is mounted to the base attached to the seaming line. Thereafter, the guide rail assembly (650), once mounted to the base over the alignment pins (634, 635), can be bolted to the frame.

In summary, right filler guide rail device (620) includes a base (624) mountable to a container sealing line, and a guide rail assembly having a first guide surface (656) adapted to guide containers along a portion of the can sealing line. The guide rail assembly includes a first member (e.g., adjustment member (670)), and a second member (e.g., guide rail (652), wherein the first and second members are adjustably attached to one another. The guide surface (656) is provided on the guide rail (652). The guide rail assembly is securable to the base after the base is mounted to the container sealing line such that the guide rail assembly and base are self-aligning with respect to one another.

FIGS. 42-43 depict left filler guide rail device (720), also known as a sweep rail. Left filler guide rail device (720) is likewise adapted for guiding cans as the cans move along a chain conveyor (CV) located between the right and left filler guide rail devices and accommodating various sized cans with at least two different sizes of guide rail assemblies. Left filler guide rail device (720) includes a guide rail assembly (750) having an elongate guide rail (752) having a guide surface (756) comprising one side edge of the guide rail. A rigidifying bracket (762) is once again mounted to the upper surface of the guide rail for increasing the rigidity and strength of the guide rail.

The left filler guide rail device (720) further includes a pair of bases (724) adapted to be fixedly attached to a frame (12) of the sealing line, as best seen in FIG. 1D. Each base (724) includes a stepped support plate (726). In the embodiment shown, the lower portion (726A) of the support plate (726) includes one or more aperture (731) for mounting the base (724) to the frame (12) using threaded fasteners (725). The base (724) further includes an alignment pin (734) extending upwardly away from the top surface of the upper portion (726B) of the support plate (726). As described below, the alignment pin (734) is received within a pin aperture (782) in an adjustment member (770) when the guide rail assembly (750) is mounted to the frame, and is used to ensure proper alignment of the guide rail assembly on the frame. It will also be noted that two bases (724) and a corresponding pair of adjustment members (770) are provided—a first set near the center of the left filler guide rail device (720), and the other set adjacent one end of the left filler guide rail device (720). It will be understood that any number of base and adjustment member pairs may be used, in a variety of locations.

Once the base (724) is attached to the frame, the left filler guide rail assembly (750) can be mounted atop the bases (724) and to the frame (12), without the need to adjust the guide rail assembly (750) or the position of the bases (724). Proper alignment of the guide rail assembly (750) with respect to the frame (12) can be accomplished by manipulation of the guide rail assembly itself so that the alignment pins (734) are received within the pin apertures (782) of the alignment members (770) rather than altering the position of the bases (724). This feature allows the guide rail assembly (750) to be quickly changed (e.g., to a guide rail assembly accommodating a different size can), as the bases (724) remains fixedly attached to the frame (12) during changeover, and the bases and guide rail assembly are self-aligning with respect to each other. Once a guide rail assembly (650) is mounted to the base over the alignment pins (734), the guide rail assembly (650) can be bolted to the frame.

As seen in FIG. 43, the adjustment member (or plate) (770) is adjustably attached to the bottom surface of the guide rail (752) using adjustment fasteners (772) (e.g., threaded bolts) received in receiving apertures (766) (e.g., threaded holes) in the adjustment member (770). The adjustment fasteners (772) are inserted through enlarged adjustment apertures (773) (e.g., through holes) that extend through the thickness of the guide rail (752).

The adjustment apertures (773) have a diameter larger than the diameter of the adjustment fasteners (772) (e.g., the diameter of the threaded shaft of a threaded bolt) such that the position of the adjustment plate (770) on the bottom surface of the guide rail (752) can be altered for alignment purposes. This allows for the position of the adjustment plates (770) to be altered so that, when the alignment pins (734) on the bases are received in the pin aperture (782) during mounting of the guide rail assembly on the bases (724), the guide rail (752) of the guide rail assembly (750) will be properly aligned with respect to the frame. Once the alignment plates (770) are correctly aligned with respect to the guide rail (752), no further alignment is typically necessary when the guide rail assembly (650) is mounted to the base attached to the seaming line.

In summary, left filler guide rail device (720) includes a pair of bases (724) mountable to a container sealing line and a guide rail assembly having a first guide surface (756) adapted to guide containers along a portion of the can sealing line. The guide rail assembly includes a first member (e.g., adjustment members (770)) and a second member (e.g., guide rail (752), wherein the first and second members are adjustably attached to one another. The guide surface (756) is provided on the guide rail (752). The guide rail assembly is securable to the base after the base is mounted to the container sealing line such that the guide rail assembly and base are self-aligning with respect to one another.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an exemplary embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "up", "down", "left", "right", "first", "second", etc., in the present disclosure is meant to provide orientation for the reader with reference to the drawings and is not intended to be the required orientation of the components or graphical images or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative FIG. Additionally, the inclusion of a structural or method feature in a particular FIG. is not meant to imply that such feature is required in all embodiments and, in some embodiments, it may not be included or may be combined with other features.

As used herein, the terms "about", "approximately," etc., in reference to a number, is used herein to include numbers that fall within a range of 10%, 5%, or 1% in either direction (greater than or less than) the number unless otherwise stated or otherwise evident from the context (except where such number would exceed 100% of a possible value).

While various embodiments of replaceable guide rail devices for container seaming systems have been described in detail above, it will be understood that the components, features and configurations, as well as the methods of manufacturing the devices and methods described herein are not limited to the specific embodiments described herein.

The invention claimed is:

1. A guide rail device mountable to a container sealing line for guiding moving containers, comprising:
   a base mountable to the container sealing line; and
   a guide rail assembly having a first guide surface adapted to guide containers along a portion of the container sealing line, wherein the guide rail assembly comprises:

a first rail having a body defining first and second opposing surfaces, wherein the first guide surface extends between the first and second surfaces; and
   an adjustment member mateable against a first surface of the body of the first rail, the adjustment member configured to be adjustably attached to the body of the first rail;
   wherein when the adjustment member is mated against the first surface of the body of the first rail and the base is mounted to the container sealing line, the adjustment member is non-adjustably securable to the base, and
   wherein the first rail is adjustable in its position relative to the adjustment member after the adjustment member is non-adjustably secured to the base.

2. The guide rail device of claim 1, wherein the adjustment member is mountable to the first rail in one of a plurality of horizontally displaced positions, wherein a selected horizontally displaced position is such that the first rail suitably engages a container of the container sealing line when the adjustment member is non-adjustably secured to the base.

3. The guide rail device of claim 1, wherein the guide rail assembly is securable to the base such that the second surface of the body of the first rail engages the base with the adjustment member separated at least in part from the base by the first rail.

4. The guide rail device of claim 2, wherein the guide rail assembly further includes a plurality of adjustment fasteners for adjustably attaching the first rail to the adjustment member when the adjustment member is non-adjustably secured to the base.

5. The guide rail device of claim 4, wherein:
   each adjustment fastener has a diameter;
   one of said first rail and the adjustment member includes a plurality of adjustment apertures through which said adjustment fasteners extend, the adjustment apertures having an inner diameter greater than the diameter of the adjustment fasteners; and
   the other of said first rail and the adjustment member includes a plurality of receiving apertures alignable with said adjustment apertures, the receiving apertures adapted to receive the adjustment fasteners therein for adjustable attachment of the first rail and the adjustment member.

6. The guide rail device of claim 5, further comprising a second rail attached to the first rail, wherein the second rail has a second guide surface adapted to guide containers along a portion of the container sealing line.

7. The guide rail device of claim 6, wherein said first guide surface is provided on said first rail, and the first rail and the second rail are secured to one another in a spaced-apart relationship, with the adjustment member located between the first rail and the second rail.

8. The guide rail device of claim 7, wherein the adjustment member and the second rail are located in a spaced-apart relationship.

9. The guide rail device of claim 1, wherein the guide rail assembly further includes a plurality of mounting fasteners for non-adjustably securing the guide rail assembly to the base.

10. The guide rail device of claim 9, wherein each of said mounting fasteners extends through an aperture in the first rail and is retained on the guide rail assembly.

11. The guide rail device of claim 10, wherein the base includes a plurality of apertures for receiving the mounting fasteners therein for non-adjustably securing the guide rail assembly to the base.

12. The guide rail device of claim 9, wherein each of said mounting fasteners includes a mounting bolt having a shaft comprising an upper unthreaded portion, a threaded middle portion extending from the upper portion, and a lower unthreaded portion extending from the middle portion, the lower unthreaded portion having a second diameter smaller than a first diameter of the first unthreaded portion.

13. The guide rail device of claim 11, wherein:

each of said mounting fasteners extends through an aperture in the first rail, and is retained on the guide rail assembly; and the base includes a plurality of mounting apertures for receiving the mounting fasteners therein for non-adjustably securing the guide rail assembly to the base, the mounting apertures extending from a support surface of the base;

wherein each of the receiving apertures in the base includes an internally threaded first portion adapted for threadably receiving a middle portion of a mounting fastener, and a second guide portion adapted for receiving a lower portion of a mounting fastener for securing the guide rail assembly to the base.

14. A guide rail device mountable to a container sealing line for guiding moving containers, comprising:

a base mountable to the container sealing line for supporting the guide rail device in at least one vertical position with respect to the container sealing line; and a guide rail assembly, comprising:

a first guide rail having a body defining first and second opposing surfaces and defining a first guide surface adapted to guide containers along a portion of the container sealing line, wherein the first guide surface extends between the first and second surfaces; and an adjustment member mateable against a first surface of the body of the first rail and adjustably securable to the body of the first guide rail in one of a plurality of horizontally displaced positions and securable to the base in a non-adjustable position after being secured to the body of the first guide rail, wherein a selected horizontally displaced position is such that the first guide surface of the first guide rail suitably engages a container of the container sealing line when the adjustment member is secured to the base, wherein when the adjustment member is mated against the first surface of the body of the first rail and the base is mounted to the container sealing line, the first rail and the adjustment member are together non-adjustably securable to the base, wherein the first rail is adjustable in its position relative to the adjustment member after the first rail and the adjustment member are together non-adjustably secured to the base.

15. A guide rail device mountable to a container sealing line for guiding moving containers, comprising:

a base mountable to the container sealing line; and a guide rail assembly having a first guide surface adapted to guide containers along a portion of the container sealing line, wherein the guide rail assembly comprises:

a first member;

a second member, wherein the first and second members are adjustably attachable to one another; and a plurality of mounting fasteners for non-adjustably securing the guide rail assembly to the base, wherein each of said mounting fasteners extends through an aperture in the first member and is retained on the guide rail assembly, wherein each of said mounting fasteners includes a mounting bolt having a shaft comprising an upper portion, a threaded middle portion extending from the upper portion, and a lower portion extending from the middle portion, wherein the base includes a plurality of mounting apertures for receiving the mounting fasteners therein for non-adjustably securing the guide rail assembly to the base, the mounting apertures extending from a support surface of the base, wherein each of the receiving apertures in the base includes an internally threaded first portion adapted for threadably receiving a middle portion of a mounting fastener, and a second guide portion adapted for receiving a lower portion of a mounting fastener for securing the guide rail assembly to the base, and wherein the guide rail assembly is securable to the base after the base is mounted to the container sealing line such that the guide rail assembly and base are self-aligning with respect to one another.

* * * * *